US012593323B2

(12) United States Patent
Guo et al.

(10) Patent No.: US 12,593,323 B2
(45) Date of Patent: Mar. 31, 2026

(54) HYBRID AUTOMATIC REPEAT REQUEST (HARQ)-ACKNOWLEDGMENT (ACK) ENHANCEMENT FOR SEMI-PERSISTENT SCHEDULED (SPS) PHYSICAL DOWNLINK SHARED CHANNEL (PDSCH) IN AN UNLICENSED NEW RADIO SPECTRUM (NR-U)

(71) Applicant: QUALCOMM Incorporated, San Diego, CA (US)

(72) Inventors: Shaozhen Guo, Beijing (CN); Jing Sun, San Diego, CA (US); Changlong Xu, Beijing (CN); Xiaoxia Zhang, San Diego, CA (US); Rajat Prakash, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 660 days.

(21) Appl. No.: 18/014,719

(22) PCT Filed: Aug. 21, 2020

(86) PCT No.: PCT/CN2020/110429
§ 371 (c)(1),
(2) Date: Jan. 5, 2023

(87) PCT Pub. No.: WO2022/036666
PCT Pub. Date: Feb. 24, 2022

(65) Prior Publication Data
US 2023/0300816 A1  Sep. 21, 2023

(51) Int. Cl.
*H04W 72/11* (2023.01)
*H04L 1/1812* (2023.01)
(Continued)

(52) U.S. Cl.
CPC ........... *H04W 72/11* (2023.01); *H04L 1/1812* (2013.01); *H04L 5/0053* (2013.01); *H04W 72/1273* (2013.01)

(58) Field of Classification Search
CPC ............. H04W 72/11; H04W 72/1263; H04W 72/1268; H04W 72/1273; H04L 1/1812; H04L 5/0053
See application file for complete search history.

(56) References Cited

U.S. PATENT DOCUMENTS

| | | | | |
|---|---|---|---|---|
| 11,990,999 B2 * | 5/2024 | Xiao | ..................... | H04L 1/1864 |
| 2019/0261361 A1 | 8/2019 | Xiong et al. | | |

(Continued)

FOREIGN PATENT DOCUMENTS

| | | |
|---|---|---|
| CN | 110830151 A | 2/2020 |
| CN | 111132329 A | 5/2020 |
| WO | 2019192583 A1 | 10/2019 |

OTHER PUBLICATIONS

Supplementary European Search Report—EP20949876—Search Authority—Munich—Jul. 16, 2024.
(Continued)

*Primary Examiner* — Kent Krueger
(74) *Attorney, Agent, or Firm* — Qualcomm Incorporated/Seyfarth Shaw LLP

(57) ABSTRACT

A method of wireless communication, by a user equipment (UE) includes receiving downlink semi-persistent scheduling (SPS) configurations. The method also includes receiving a physical downlink shared channel (PDSCH) transmission for each of the plurality of SPS configurations. Each PDSCH transmission has no associated physical downlink control channel (PDCCH). The method further includes determining whether successful decoding of each of the PDSCH transmissions occurred. The method further includes generating a hybrid automatic repeat request
(Continued)

490

No dynamic grant for retx for concerned HARQ process gNB

PUCCH#2

UE

344

472

Timer starts

ACK/NACK retx timer

ACK/NACK retx

346

476

Timer expires

Once timer expires, autonomous retx of ACK/NACK is triggered (HARQ) codebook for the PDSCH transmissions based on the determining. The method also includes transmitting the HARQ codebook in a physical uplink control channel (PUCCH) only when at least one ACK is present in the HARQ codebook.

18 Claims, 14 Drawing Sheets

(51) Int. Cl.
  *H04L 5/00*  (2006.01)
  *H04W 72/1273*  (2023.01)

(56) References Cited

U.S. PATENT DOCUMENTS

| | | | |
|---|---|---|---|
| 2019/0349899 A1 | 11/2019 | Ang et al. | |
| 2020/0205141 A1 | 6/2020 | Khoshnevisan et al. | |
| 2023/0006798 A1* | 1/2023 | Lee | H04L 5/0055 |
| 2024/0048289 A1* | 2/2024 | Takahashi | H04L 1/1812 |

OTHER PUBLICATIONS

Moderator (Nokia): "Feature Lead Summary #1 on Rel-17 HARQ-ACK Feedback Enhancements for NR Rel-17 URLLC/IIoT (AI 8.3.1.1)", R1-2007059, 3rd Generation Partnership Project Mobile Competence Centre, e-Meeting, Aug. 17, 2020-Aug. 28, 2020, Aug. 19, 2020, 28 Pages.
Supplementary Partial European Search Report—EP20949876—Search Authority—The Hague—Apr. 23, 2024.
Moderator (Nokia): "Feature Lead Summary #1 on Rel-17 HARQ-ACK Feedback Enhancements for NR Rel-17 URLLC/IIoT (AI 8.3.1.1)", 3GPP TSG-RAN WG1 Meeting #102-e, R1-2007059, e-Meeting, Aug. 17-28, 2020, pp. 1-29.
International Search Report and Written Opinion—PCT/CN2020/110429—ISA/EPO—May 19, 2021.
NTT Docomo Inc: "Discussions on DL SPS Enhancement", 3GPP Draft, 3GPP TSG RAN WG1 #99, R1-1912891, 3rd Generation Partnership Project (3GPP), Mobile Competence Centre, 650, Route Des Lucioles, F-06921, Sophia-Antipolis Cedex, France, vol. RAN WG1, No. Reno, USA, Nov. 18, 2019-Nov. 22, 2019, Nov. 9, 2019 (Nov. 9, 2019), XP051823670, pp. 1-9, Sections 2-3, pp. 5-7, pp. 6-7, the whole document.

* cited by examiner

PUCCH for ACK/NACK
retransmission
PUCCH for ACK/NACK
new transmission
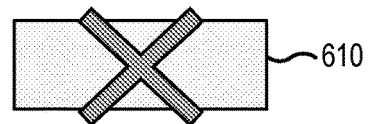
PUCCH for ACK/NACK retx is prioritized
*FIG. 6A*
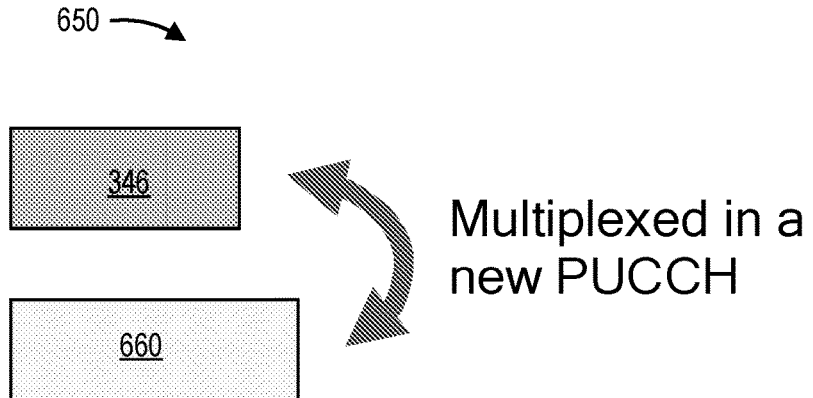
PUCCH for ACK/NACK retx is multiplexed with
PUCCH for ACK/NACK new transmission
*FIG. 6B*

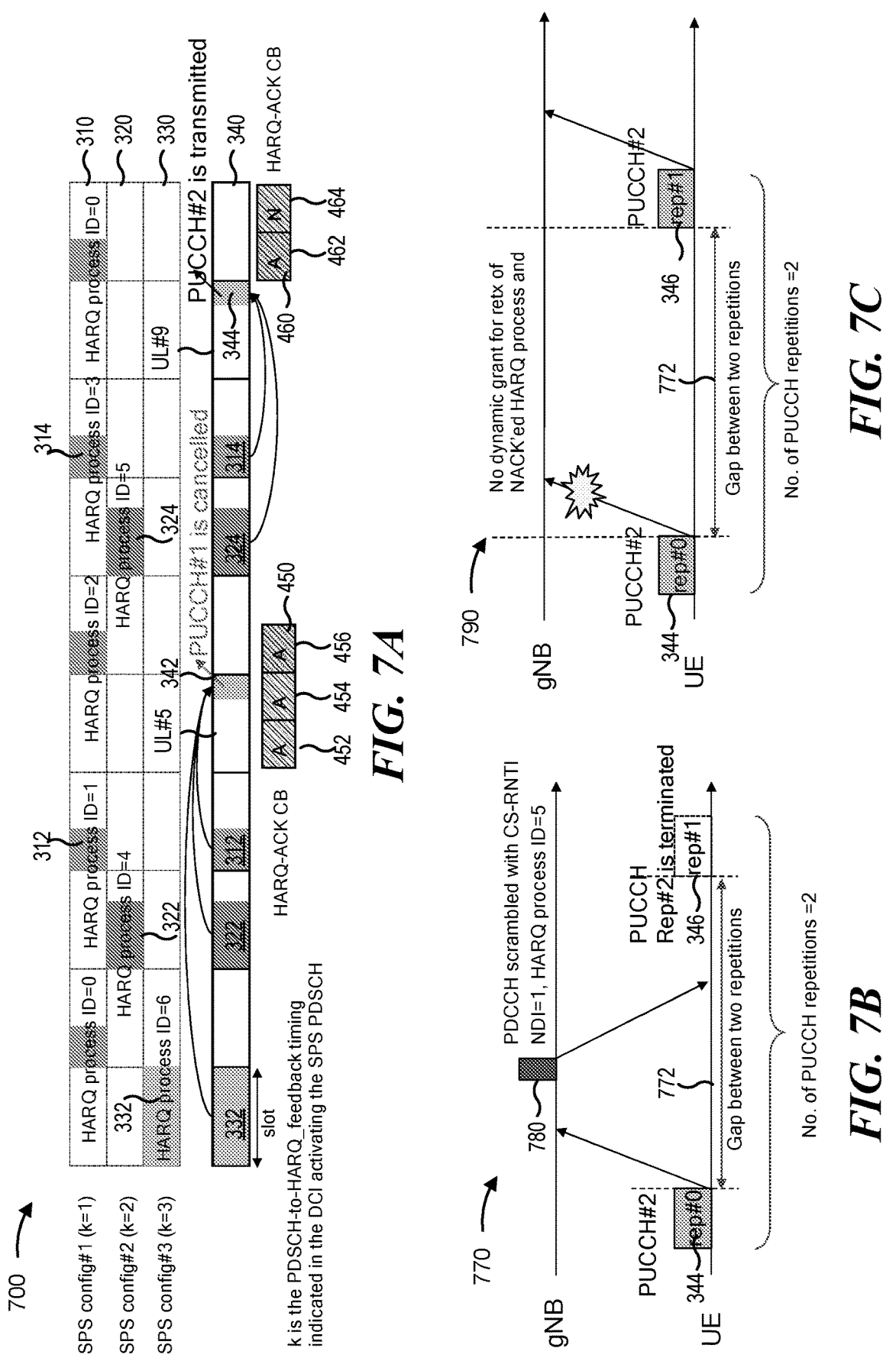

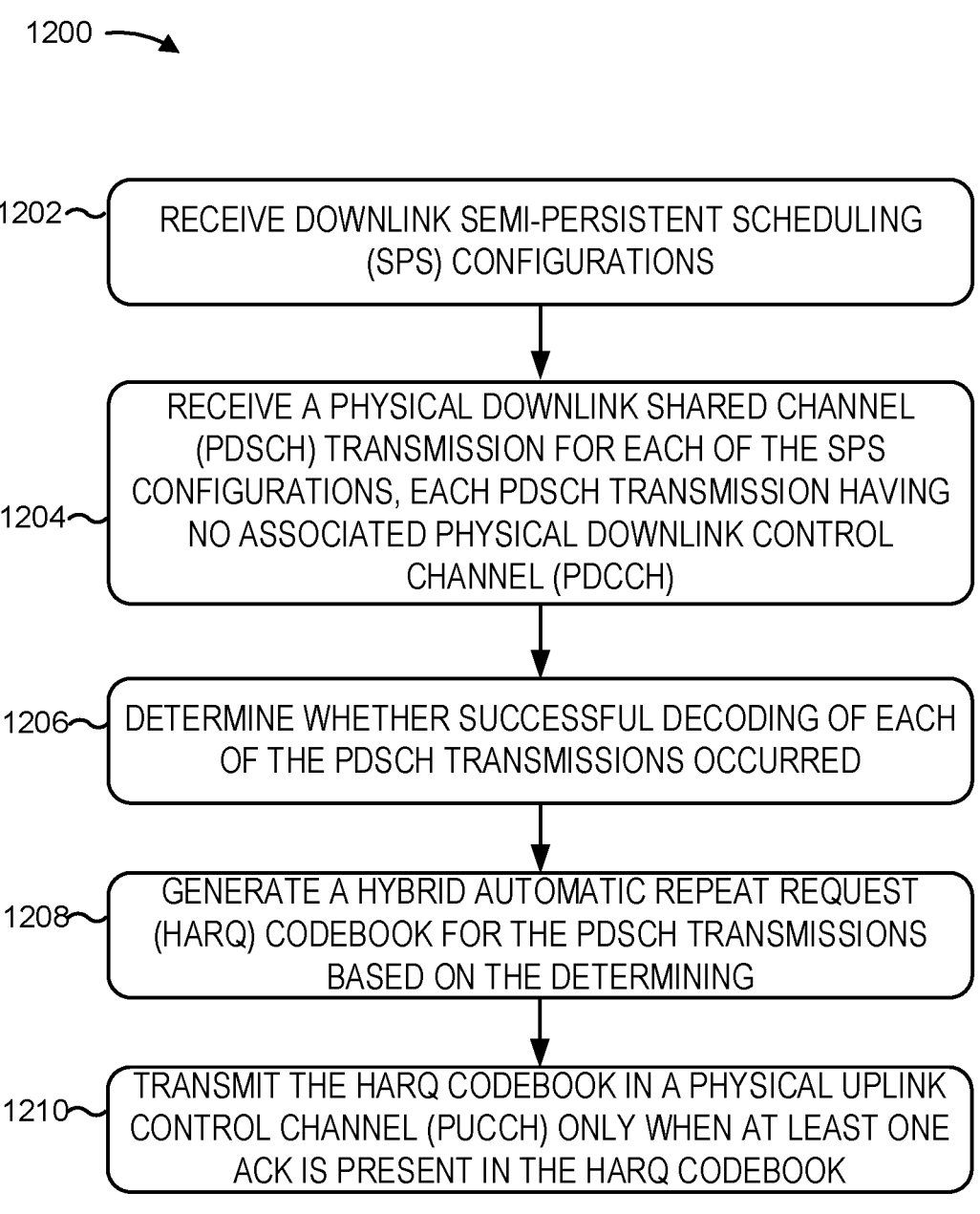

1200

1202 — RECEIVE DOWNLINK SEMI-PERSISTENT SCHEDULING (SPS) CONFIGURATIONS

1204 — RECEIVE A PHYSICAL DOWNLINK SHARED CHANNEL (PDSCH) TRANSMISSION FOR EACH OF THE SPS CONFIGURATIONS, EACH PDSCH TRANSMISSION HAVING NO ASSOCIATED PHYSICAL DOWNLINK CONTROL CHANNEL (PDCCH)

1206 — DETERMINE WHETHER SUCCESSFUL DECODING OF EACH OF THE PDSCH TRANSMISSIONS OCCURRED

1208 — GENERATE A HYBRID AUTOMATIC REPEAT REQUEST (HARQ) CODEBOOK FOR THE PDSCH TRANSMISSIONS BASED ON THE DETERMINING

1210 — TRANSMIT THE HARQ CODEBOOK IN A PHYSICAL UPLINK CONTROL CHANNEL (PUCCH) ONLY WHEN AT LEAST ONE ACK IS PRESENT IN THE HARQ CODEBOOK

*FIG. 12*

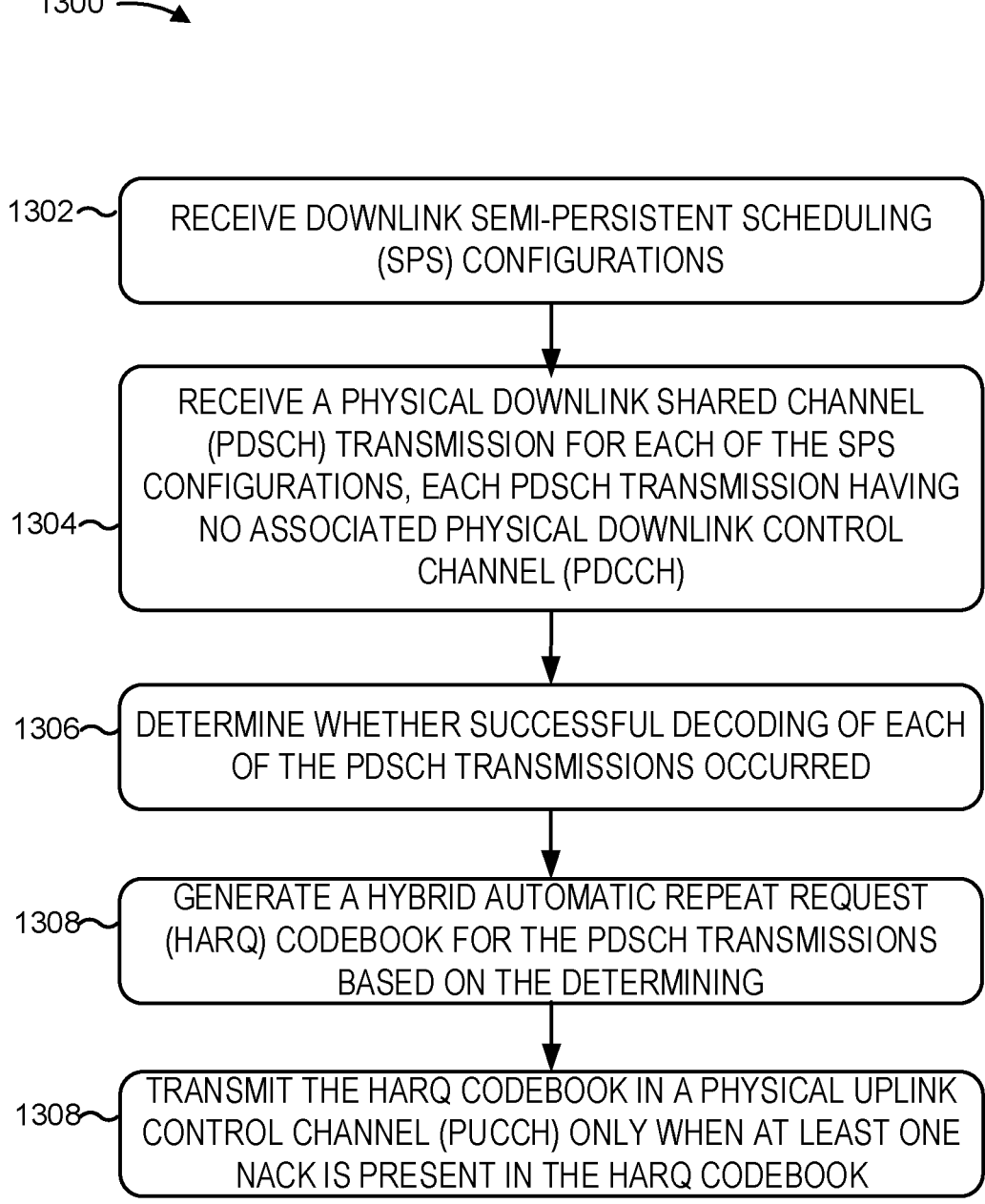

1300

1302 — RECEIVE DOWNLINK SEMI-PERSISTENT SCHEDULING (SPS) CONFIGURATIONS

1304 — RECEIVE A PHYSICAL DOWNLINK SHARED CHANNEL (PDSCH) TRANSMISSION FOR EACH OF THE SPS CONFIGURATIONS, EACH PDSCH TRANSMISSION HAVING NO ASSOCIATED PHYSICAL DOWNLINK CONTROL CHANNEL (PDCCH)

1306 — DETERMINE WHETHER SUCCESSFUL DECODING OF EACH OF THE PDSCH TRANSMISSIONS OCCURRED

1308 — GENERATE A HYBRID AUTOMATIC REPEAT REQUEST (HARQ) CODEBOOK FOR THE PDSCH TRANSMISSIONS BASED ON THE DETERMINING

1308 — TRANSMIT THE HARQ CODEBOOK IN A PHYSICAL UPLINK CONTROL CHANNEL (PUCCH) ONLY WHEN AT LEAST ONE NACK IS PRESENT IN THE HARQ CODEBOOK

*FIG. 13*

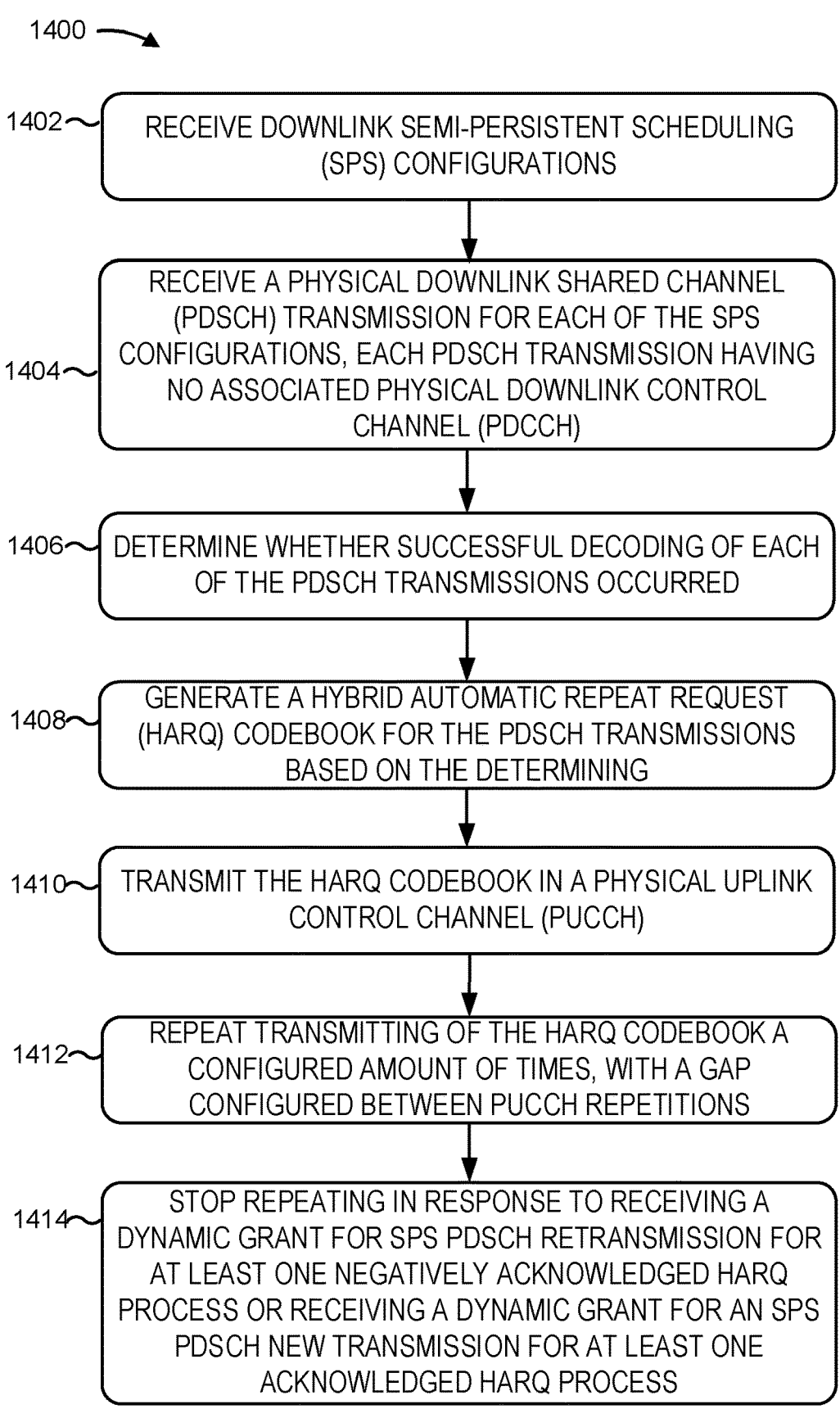

1400

1402 — RECEIVE DOWNLINK SEMI-PERSISTENT SCHEDULING (SPS) CONFIGURATIONS

1404 — RECEIVE A PHYSICAL DOWNLINK SHARED CHANNEL (PDSCH) TRANSMISSION FOR EACH OF THE SPS CONFIGURATIONS, EACH PDSCH TRANSMISSION HAVING NO ASSOCIATED PHYSICAL DOWNLINK CONTROL CHANNEL (PDCCH)

1406 — DETERMINE WHETHER SUCCESSFUL DECODING OF EACH OF THE PDSCH TRANSMISSIONS OCCURRED

1408 — GENERATE A HYBRID AUTOMATIC REPEAT REQUEST (HARQ) CODEBOOK FOR THE PDSCH TRANSMISSIONS BASED ON THE DETERMINING

1410 — TRANSMIT THE HARQ CODEBOOK IN A PHYSICAL UPLINK CONTROL CHANNEL (PUCCH)

1412 — REPEAT TRANSMITTING OF THE HARQ CODEBOOK A CONFIGURED AMOUNT OF TIMES, WITH A GAP CONFIGURED BETWEEN PUCCH REPETITIONS

1414 — STOP REPEATING IN RESPONSE TO RECEIVING A DYNAMIC GRANT FOR SPS PDSCH RETRANSMISSION FOR AT LEAST ONE NEGATIVELY ACKNOWLEDGED HARQ PROCESS OR RECEIVING A DYNAMIC GRANT FOR AN SPS PDSCH NEW TRANSMISSION FOR AT LEAST ONE ACKNOWLEDGED HARQ PROCESS

*FIG. 14*

HYBRID AUTOMATIC REPEAT REQUEST (HARQ)-ACKNOWLEDGMENT (ACK) ENHANCEMENT FOR SEMI-PERSISTENT SCHEDULED (SPS) PHYSICAL DOWNLINK SHARED CHANNEL (PDSCH) IN AN UNLICENSED NEW RADIO SPECTRUM (NR-U)

FIELD OF THE DISCLOSURE

Aspects of the present disclosure generally relate to wireless communications, and more particularly to techniques and apparatuses for 5G new radio (NR) hybrid automatic repeat request (HARD)-acknowledgment (ACK) enhancement for semi-persistent scheduled (SPS) physical downlink shared channel (PDSCH) in an unlicensed NR spectrum (NR-U).

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

A method of wireless communication, by a user equipment (UE) is described. The method includes receiving downlink semi-persistent scheduling (SPS) configurations. The method also includes receiving a physical downlink shared channel (PDSCH) transmission for each of the plurality of SPS configurations. Each PDSCH transmission has no associated physical downlink control channel (PDCCH). The method further includes determining whether successful decoding of each of the PDSCH transmissions occurred. The method further includes generating a hybrid automatic repeat request (HARQ) codebook for the PDSCH transmissions based on the determining. The method also includes transmitting the HARQ codebook in a physical uplink control channel (PUCCH) only when at least one ACK is present in the HARQ codebook.

A method of wireless communication, by a user equipment (UE) is described. The method includes receiving downlink semi-persistent scheduling (SPS) configurations. The method also includes receiving a physical downlink shared channel (PDSCH) transmission for each of the plurality of SPS configurations. Each PDSCH transmission has no associated physical downlink control channel (PDCCH). The method further includes determining whether successful decoding of each of the PDSCH transmissions occurred. The method further includes generating a hybrid automatic repeat request (HARQ) codebook for the PDSCH transmissions based on the determining. The method also includes transmitting the HARQ codebook in a physical uplink control channel (PUCCH) only when at least one NACK is present in the HARQ codebook.

A method of wireless communication, by a user equipment (UE) is described. The method includes receiving a plurality of downlink semi-persistent scheduling (SPS) configurations. The method also includes receiving a physical downlink shared channel (PDSCH) transmission for each of the plurality of SPS configurations. Each PDSCH transmission has no associated physical downlink control channel (PDCCH). The method further includes determining whether successful decoding of each of the PDSCH transmissions occurred. The method also includes generating a hybrid automatic repeat request (HARQ) codebook for the PDSCH transmissions based on the determining. The method further includes transmitting the HARQ codebook in a physical uplink control channel (PUCCH). The method further includes repeating transmitting of the HARQ codebook a configured amount of times, with a gap configured between PUCCH repetitions. The method also includes stopping repeating in response to receiving a dynamic grant for SPS PDSCH retransmission for at least one negatively acknowledged HARQ process or receiving a dynamic grant for an SPS PDSCH new transmission for at least one acknowledged HARQ process.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description, may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

FIGS. 6A and 6B are block diagrams illustrating variations for handling collisions between a hybrid automatic repeat request (HARD)-acknowledgment (ACK) codebook retransmission and a physical uplink control channel (PUCCH) acknowledgment/negative acknowledgment (ACK/NACK) for a new transmission, in accordance with aspects of the present disclosure.

FIGS. 7A-7C are diagrams illustrating a negative acknowledgment (NACK)-only transmission for semi-persistent scheduled (SPS) physical downlink shared channels (PDSCHs) without an associated physical downlink control channel (PDCCH), in accordance with another aspect of the present disclosure.

FIG. 12 is a diagram illustrating an example process performed, for example, by a user equipment (UE), in accordance with various aspects of the present disclosure.

FIG. 13 is a diagram illustrating an example process performed, for example, by a user equipment (UE), in accordance with various aspects of the present disclosure.

FIG. 14 is a diagram illustrating an example process performed, for example, by a user equipment (UE), in accordance with various aspects of the present disclosure.

DETAILED DESCRIPTION

Figure 1:
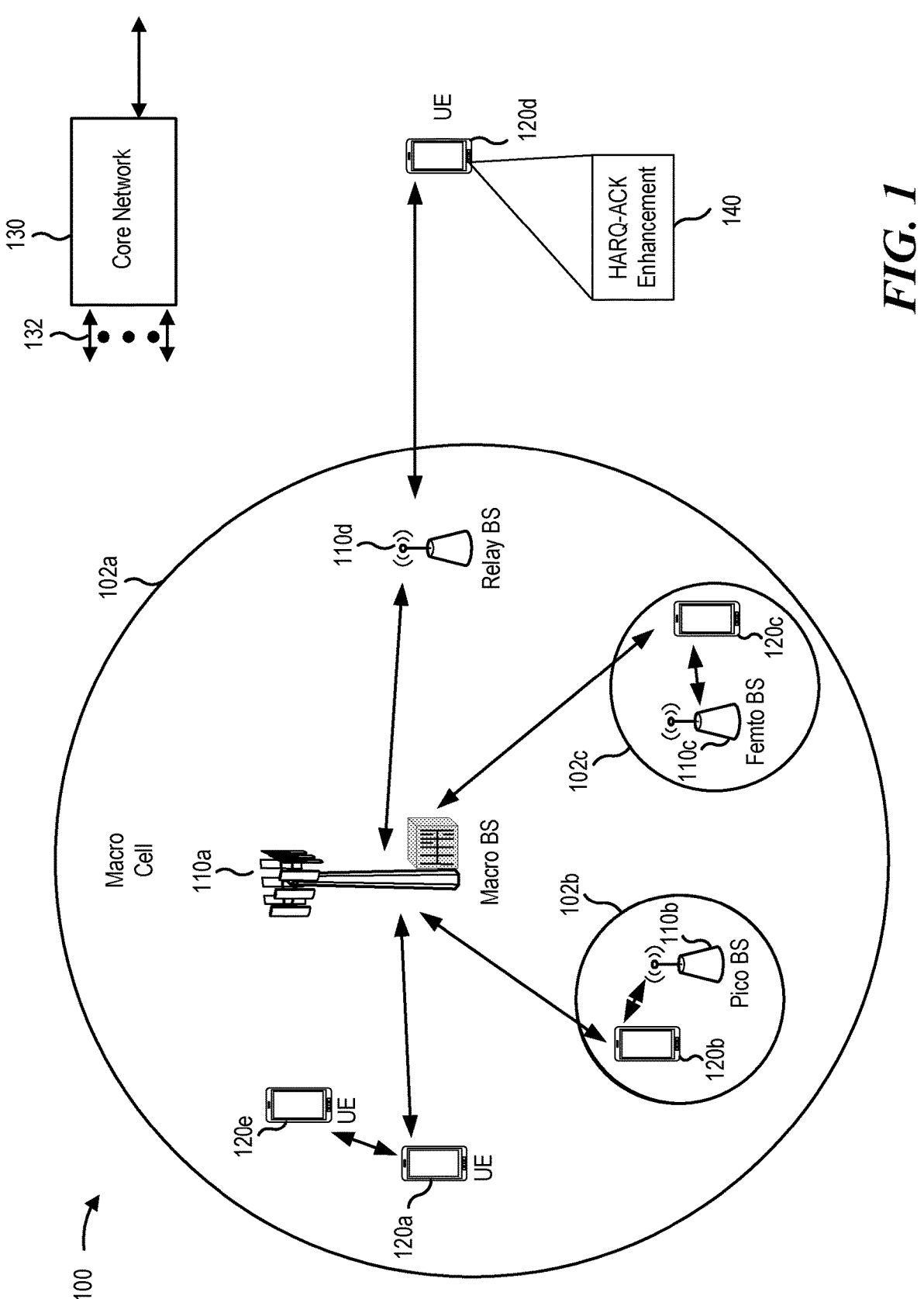
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

According to the current 5G NR standards (e.g., 3GPP Release-16), multiple downlink (DL) semi-persistent scheduling (SPS) configurations are supported for a given bandwidth part (BWP) of a serving cell. In addition, multiple downlink SPS configurations may be configured on different serving cells in a cell group. In certain cases, only one hybrid automatic repeat request (HARD)-acknowledgment (ACK) feedback is reported for SPS physical downlink shared channels (PDSCHs). For example, only one HARQ-ACK feedback is reported for SPS PDSCHs when dynamic PDSCH HARQ-ACK is not available.

The current 5G NR standard (e.g., 3GPP Release-16) supports multiple downlink SPS configurations. As a result, it is possible that a HARQ-ACK for more than one SPS PDSCH is reported in one PUCCH. According to this current 5G NR standard, a HARQ-ACK feedback for SPS PDSCHs without an associated PDCCH is reported regardless of whether the SPS PDSCH is transmitted. That is, reporting HARQ-ACK feedback for SPS PDSCHs without an associated PDCCH regardless of whether the SPS PDSCH is transmitted is an inefficient use of PUCCH resources.

Aspects of the present disclosure are directed to options for improving PUCCH resource utilization. In one aspect of the present disclosure, a first option is directed to reporting an ACK-only for SPS PDSCH transmissions without an associated PDCCH. In another aspect of the present disclosure, a second option is directed to reporting a negative acknowledgment (NACK) for SPS PDSCH transmission without an associated PDCCH. Additional aspects of the present disclosure include scheduling retransmission requests, multiplexing PUCCH control information during collisions, as well as power ramping, beam sweeping and/or frequency hopping for retransmissions.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G node B (NB), an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

As an example, the BSs 110 (shown as BS 110a, BS 110b, BS 110c, and BS 110d) and the core network 130 may exchange communications via backhaul links 132 (e.g., S1, etc.). Base stations 110 may communicate with one another over other backhaul links (e.g., X2, etc.) either directly or indirectly (e.g., through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (e.g., S1, S2, etc.) and may perform radio configuration and scheduling for communications with the UEs 120. In some configurations, various functions of each access network entity or base station 110 may be distributed across various network devices (e.g., radio heads and access network controllers) or consolidated into a single network device (e.g., a base station 110).

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a hand-held device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless communications system 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

The UEs 120 may include a HARQ-ACK enhancement module 140. For brevity, only one UE 120d is shown as including the HARQ-ACK enhancement module 140. The HARQ-ACK enhancement module 140 is configured to receive a plurality of downlink semi-persistent scheduling (SPS) configurations. The HARQ-ACK enhancement module 140 is also configured to receive a physical downlink shared channel (PDSCH) transmission for each of the plurality of SPS configurations. Each PDSCH transmission has no associated physical downlink control channel (PDCCH). The HARQ-ACK enhancement module 140 is further configured to determine whether successful decoding of each of the PDSCH transmissions occurred. The HARQ-ACK enhancement module 140 is also configured to generate a hybrid automatic repeat request (HARQ) codebook for the PDSCH transmissions based on the determining. The HARQ-ACK enhancement module 140 is also configured to transmit the HARQ codebook in a physical uplink control channel (PUCCH) only when at least one ACK is present in the HARQ codebook.

The UEs 120 may include a HARQ-ACK enhancement module 140. For brevity, only one UE 120d is shown as including the HARQ-ACK enhancement module 140. The HARQ-ACK enhancement module 140 is configured to receive a plurality of downlink semi-persistent scheduling (SPS) configurations. The HARQ-ACK enhancement module 140 is also configured to receive a physical downlink shared channel (PDSCH) transmission for each of the plurality of SPS configurations. Each PDSCH transmission has no associated physical downlink control channel (PDCCH). The HARQ-ACK enhancement module 140 is further configured to determine whether successful decoding of each of the PDSCH transmissions occurred. The HARQ-ACK enhancement module 140 is also configured to generate a hybrid automatic repeat request (HARQ) codebook for the PDSCH transmissions based on the determining. The HARQ-ACK enhancement module 140 is also configured to transmit the HARQ codebook in a physical uplink control channel (PUCCH) only when at least one NACK is present in the HARQ codebook.

In another aspect of the present disclosure, the HARQ-ACK enhancement module 140 is configured to receive a plurality of downlink semi-persistent scheduling (SPS) configurations. The HARQ-ACK enhancement module 140 is also configured to receive a physical downlink shared channel (PDSCH) transmission for each of the plurality of SPS configurations. Each PDSCH transmission having no associated physical downlink control channel (PDCCH). The HARQ-ACK enhancement module 140 is further configured to determine whether successful decoding of each of the PDSCH transmissions occurred. The HARQ-ACK enhancement module 140 is also configured to generate a hybrid automatic repeat request (HARQ) codebook for the PDSCH transmissions based on the determining. The HARQ-ACK enhancement module 140 is further configured to transmit the HARQ codebook in a physical uplink control channel (PUCCH). The HARQ-ACK enhancement module 140 is also configured to repeat transmitting of the HARQ codebook a configured amount of times, with a gap configured between PUCCH repetitions. The HARQ-ACK enhancement module 140 is further configured to stop repeating in response to receiving a dynamic grant for SPS PDSCH retransmission for at least one negatively acknowledged HARQ process or receiving a dynamic grant for an SPS PDSCH new transmission for at least one acknowledged HARQ process.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

As indicated above, FIG. 1 is provided merely as an example. Other examples may differ from what is described with regard to FIG. 1.

Figure 2:
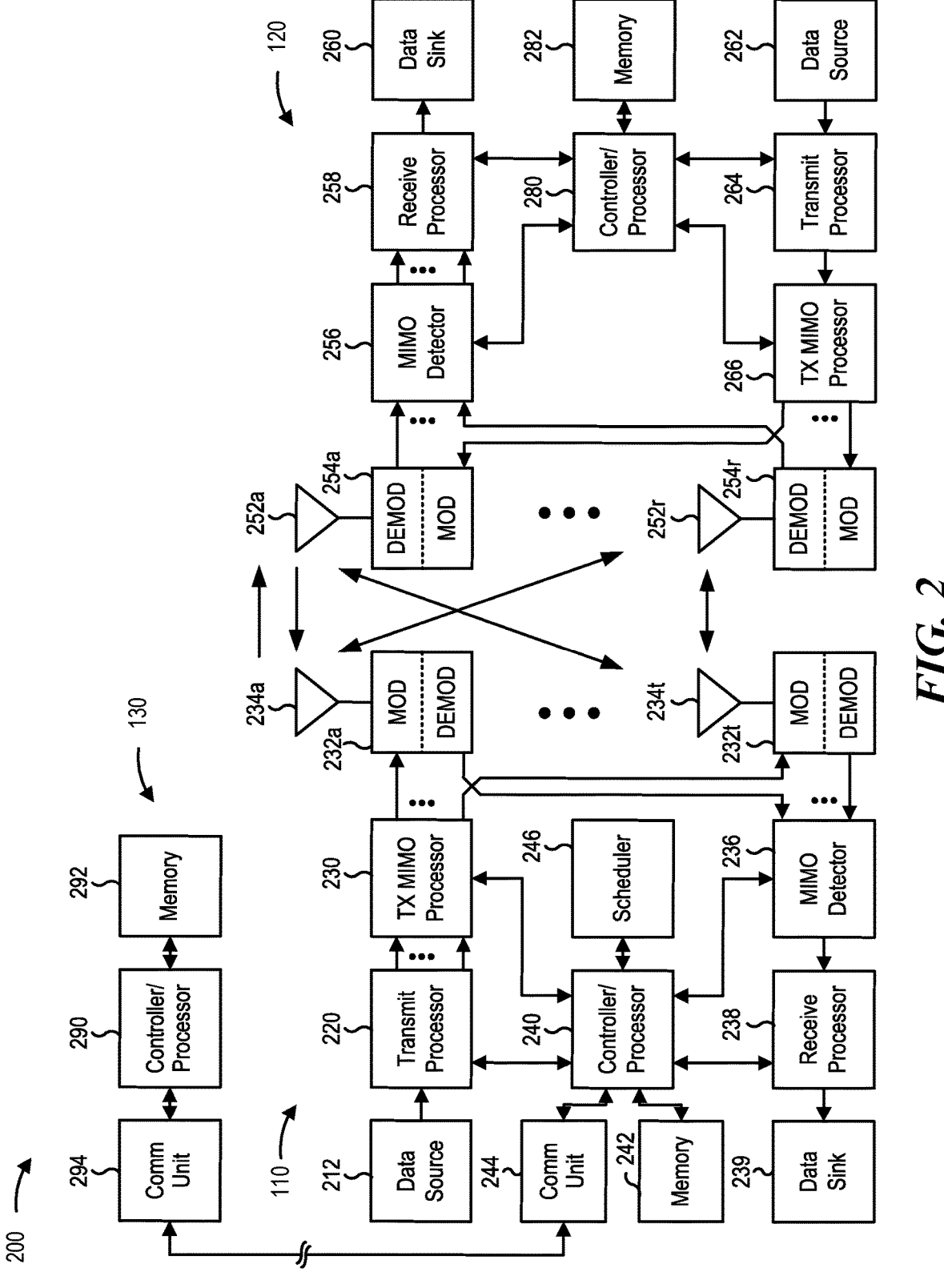
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 280 of the UE 120, and/or any other component(s) of FIG. 2 may perform one or more techniques associated with 5G new radio (NR) hybrid automatic repeat request (HARD)-acknowledgment (ACK) enhancement for SPS physical downlink shared channel (PDSCH), as described in more detail elsewhere. For example, the controller/processor 280 of the UE 120, and/or any other component(s) of FIG. 2 may perform or direct operations of, for example, the process of FIGS. 12-14 and/or other processes as described. Memories 242 and 282 may store data and program codes for the base station 110 and UE 120, respectively. A scheduler 246 may schedule UEs for data transmission on the downlink and/or uplink.

In some aspects, the UE 120 may include means for receiving, means for determining, means for generating, means for transmitting, means for cancelling, means for starting, means for stopping, means for retransmitting, means for appending, means for repeating, and/or means for selecting. Such means may include one or more components of the UE 120 described in connection with FIG. 2.

As indicated above, FIG. 2 is provided merely as an example. Other examples may differ from what is described with regard to FIG. 2.

According to the current 5G NR standard (e.g., 3GPP Release-16), multiple downlink (DL) semi-persistent scheduling (SPS) configurations are supported for a given bandwidth part (BWP) of a serving cell. In addition, multiple downlink SPS configurations can be configured on different serving cells in a cell group. In certain cases, only one hybrid automatic repeat request (HARQ)-acknowledgment (ACK) feedback is reported for SPS physical downlink shared channels (PDSCHs). For example, only one HARQ-ACK feedback is specified for SPS PDSCHs when dynamic PDSCH HARQ-ACK is not available.

In these noted cases, more than one bit of HARQ-ACK feedback is supported for SPS PDSCH without an associated grant in a physical uplink control channel (PUCCH) resource. For these cases where only HARQ-ACK feedback is reported for SPS PDSCHs, PUCCH formats 2/3/4 are applicable in addition to PUCCH formats 0/1. In addition, for these noted cases, multiple PUCCH resources are configured in common for all SPS configurations per a HARQ-ACK codebook. The actual PUCCH resource used among PUCCH resources is determined based on HARQ-ACK payload size, and the number of PUCCH resources may not exceed four (4) PUCCH resources. In addition, a PUCCH resource assigned to carry the HARQ codebook is also assigned to carry other uplink information.

For example, the actual PUCCH resources used are determined by selecting a PUCCH resource i if a HARQ-ACK payload size (not including cyclic redundancy check (CRC))

is in the range of $\{N_{i,min}, \ldots, N_{i,max}\}$, bits. In this example, the number of PUCCH resources in the selection is between zero (0) and three (3). The following equation for a resource selection procedure when a single PUCCH resource is configured per PUCCH resource set is as follows:

$N_{0,min}=1$, $N_{0,max}=2$

For $i \neq 0$ $N_{i,max}$ is configured by radio resource control (RRC) signalling; if not configured, $N_{i,max}$ is 1706; and $N_{i,min}$ is equal to $N_{i-1,max}+1$.

If a user equipment (UE) is configured with more than one SPS PDSCH configuration in the noted cases, a HARQ-ACK bit order for SPS PDSCH reception without a corresponding PDCCH is determined as follows. The HARQ-ACK bit order for SPS PDSCH reception is performed in ascending order of the downlink slot (e.g., per SPS configuration index, serving cell index), then in ascending order of SPS configuration index per serving cell index, and, finally, in ascending order of the serving cell index.

The current 5G NR standard (e.g., 3GPP Release-16), supports multiple downlink SPS configurations. As a result, it is possible that a HARQ-ACK for more than one SPS PDSCH is reported in one PUCCH. According to this current 5G NR standard, a HARQ-ACK feedback for SPS PDSCHs without an associated PDCCH is reported regardless of whether the SPS PDSCH is transmitted. That is, reporting HARQ-ACK feedback for SPS PDSCHs without an associated PDCCH, regardless of whether the SPS PDSCH is transmitted, is an inefficient use of PUCCH resources.

Aspects of the present disclosure are directed to options to improve the PUCCH resource utilization. In one aspect of the present disclosure, a first option is directed to reporting an ACK-only for SPS PDSCH transmissions without an associated PDCCH. In another aspect of the present disclosure, a second option is directed to reporting a negative acknowledgment (NACK) for SPS PDSCH transmissions without an associated PDCCH. Additional aspects of the present disclosure include scheduling retransmission requests, multiplexing PUCCH control information during collisions, as well as reliability improvements, such as power ramping and/or frequency hoping for retransmissions, and beamforming.

Figure 3:
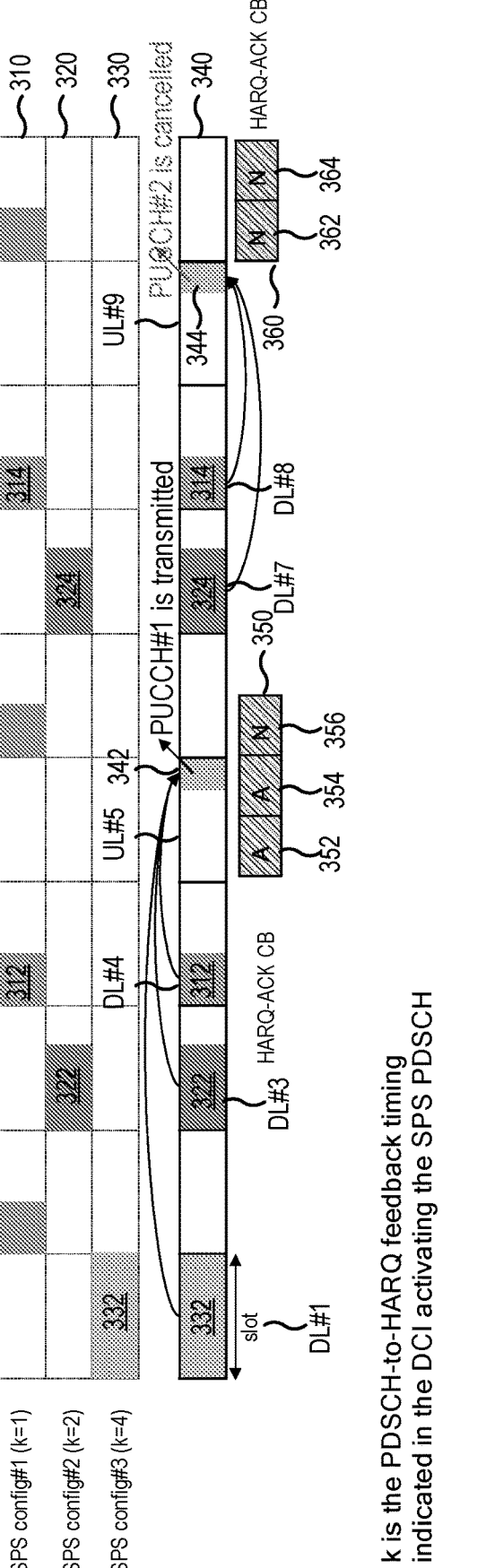
FIG. 3 is a diagram illustrating an acknowledgment (ACK)-only transmission for semi-persistent scheduled (SPS) physical downlink shared channels (PDSCHs) without an associated physical downlink control channel (PDCCH) in accordance with aspects of the present disclosure.

FIG. 3 is a diagram 300 illustrating an acknowledgment (ACK)-only transmission for semi-persistent scheduled (SPS) physical downlink shared channels (PDSCHs) without an associated physical downlink control channel (PDCCH), in accordance with aspects of the present disclosure. In this configuration, a user equipment (UE) is configured with multiple SPS PDSCH configurations, in which one hybrid automatic repeat request (HARQ)-ACK feedback codebook is reported for the multiple SPS PDSCH receptions without a corresponding PDCCH. In this configuration, a PUCCH codebook transmission is cancelled to preserve PUCCH resources.

In this example, the UE is configured with three SPS configurations. For example, a first PDSCH 310 is shown with a first SPS configuration (e.g., SPS config #1 (k=1)), in which k is the PDSCH-to-HARQ feedback timing indicated in downlink control information (DCI) when activating the first PDSCH 310. In addition, a second PDSCH 320 is shown with a second SPS configuration (e.g., SPS config #2 (k=2)). A third PDSCH 330 is shown with a third SPS configuration (e.g., SPS config #3 (k=3)). A combined PDSCH 340 is shown including data slots corresponding to downlink data from the first PDSCH 310, the second PDSCH 320, and the third PDSCH 330.

For example, the combined PDSCH 340 is shown with multiple downlink slots (e.g., DL #1, DL #3, DL #4, DL #7, and DL #8) carrying PDSCH data corresponding to the different SPS configurations. In this example, the DL #1 slot carries third SPS data 332, the DL #3 slot carries second SPS data 322, and the DL #4 slot carries first SPS data 312. According to the current NR 5G standard (e.g., Release-16), the UE generates a HARQ-ACK codebook 350 for SPS PDSCH data received on the first PDSCH 310, the second PDSCH 320, and the third PDSCH 330. The UE determines a HARQ-ACK bit order reporting the ACK/NACK in the HARQ-ACK codebook 350 for SPS PDSCH data, as described previously. In this example, a first bit 352 of the HARQ-ACK codebook 350 corresponds to the first PDSCH 310, a second bit 354 corresponds to the second PDSCH 320, and a third bit 356 corresponds to the third PDSCH 330.

According to this aspect of the present disclosure, if the PUCCH resource carrying the HARQ-ACK codebook 350 does not overlap with other PUCCH resources carrying channel state information (CSI), a scheduling request (SR), or other physical uplink shared channel (PUSCH) resources, and all the HARQ-ACK feedback results in the HARQ-ACK codebook 350 are a NACK, the UE cancels the PUCCH transmission. Otherwise, the PUCCH is transmitted. For example, the HARQ-ACK codebook 350 includes an ACK in the first bit 352 for the first SPS data 312, an ACK in the second bit 354 for the second SPS data 322, and a NACK in the third bit 356 for the third SPS data 332. Because of the ACK in the first bit 352 and second bit 354, a first PUCCH 342 (e.g., PUCCH #1) transmission of the HARQ-ACK codebook 350 is performed in an uplink (e.g., UL #5) slot in conformance with the noted k value corresponding to the SPS configurations.

Following transmission of the HARQ-ACK codebook 350 during the UL #5 slot, second SPS data 324 is received in the DL #7 slot, and a first SPS data 314 is received in the DL #8 slot. In this example, a HARQ-ACK codebook 360 includes a NACK in a first bit 362 for the first SPS data 314, and a NACK in a second bit 364 for the second SPS data 324. Because of the NACK in the first bit 362 and the NACK in the second bit 364, a second PUCCH 344 (e.g., PUCCH #2) transmission of the HARQ-ACK codebook 360 is cancelled in an uplink (e.g., UL #9) slot. Cancelling transmission of the HARQ-ACK codebook 360 improves PUCCH resource utilization.

Figures 4A, 4B, 4C:
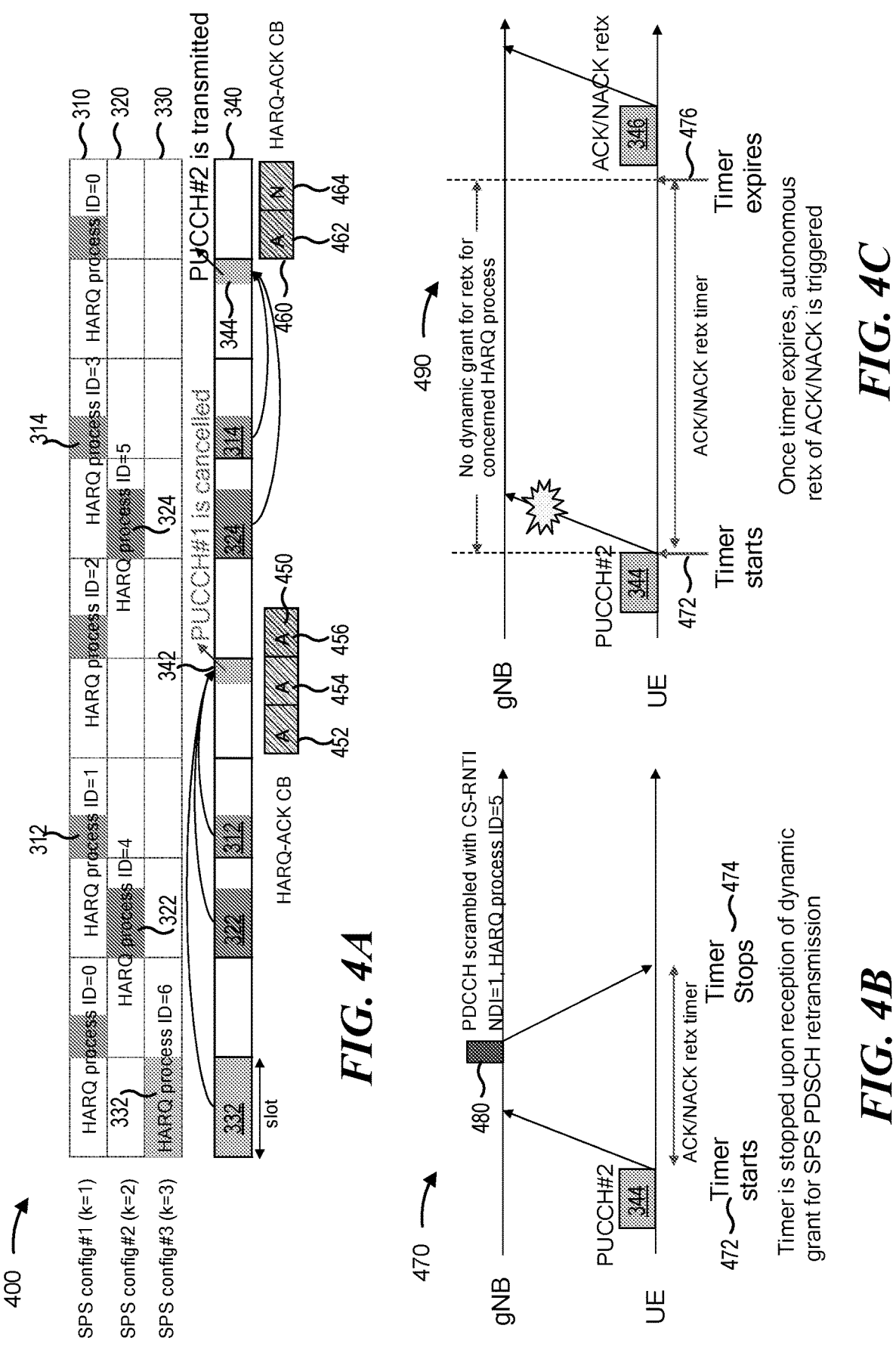
FIGS. 4A-4C are diagrams illustrating a negative acknowledgment (NACK)-only transmission for semi-persistent scheduled (SPS) physical downlink shared channels (PDSCHs) without an associated physical downlink control channel (PDCCH), in accordance with aspects of the present disclosure.

FIG. 4A is a diagram 400 illustrating a negative acknowledgment (NACK)-only transmission for semi-persistent scheduled (SPS) physical downlink shared channels (PDSCHs) without an associated physical downlink control channel (PDCCH), in accordance with aspects of the present disclosure. This example is similar to the example shown in FIG. 3 and, therefore, includes similar reference numbers, so their description is generally not repeated.

In this example, the UE is also configured with three SPS configurations, corresponding to the first PDSCH 310, the second PDSCH 320, and the third PDSCH 330. The combined PDSCH 340 is shown including data slots corresponding to downlink data from the first PDSCH 310, the second PDSCH 320, and the third PDSCH 330. According to the current NR 5G standard (e.g., 3GPP Release-16), the UE generates a HARQ-ACK codebook 450 for SPS PDSCH data received on the first PDSCH 310, the second PDSCH 320, and the third PDSCH 330. In this example, a first bit 452 of the HARQ-ACK codebook 450 corresponds to the first PDSCH 310, a second bit 454 corresponds to the second PDSCH 320, and a third bit 456 corresponds to the third PDSCH 330.

According to this aspect of the present disclosure, if the PUCCH resource carrying the HARQ-ACK codebook 450 does not overlap with other PUCCH resources carrying channel state information (CSI), a scheduling request (SR), or other PUSCH resources, and all the HARQ-ACK feedback results in the HARQ-ACK codebook 450 are an ACK, the UE cancels the PUCCH transmission. Otherwise, the PUCCH is transmitted. For example, the HARQ-ACK codebook 450 includes an ACK in the first bit 452 for the first SPS data 312, an ACK in the second bit 454 for the second SPS data 322, and an ACK in the third bit 456 for the third SPS data 332. Because of the ACK in each bit, the first PUCCH 342 (e.g., PUCCH #1) transmission of the HARQ-ACK codebook 450 is cancelled from the UL #5 slot. Cancelling transmission of the HARQ-ACK codebook 450 improves PUCCH resource utilization.

Following cancellation of the HARQ-ACK codebook 450 during the UL #5 slot, the second SPS data 324 is received in the DL #7 slot, and the first SPS data 314 is received in the DL #8 slot. In this example, a HARQ-ACK codebook 460 includes an ACK in a first bit 462 for the first SPS data 314, and a NACK in a second bit 464 for the second SPS data 324. Because of the NACK in the second bit 464, transmission of the second PUCCH 344 (e.g., PUCCH #2) of the HARQ-ACK codebook 460 is performed in the UL #9 slot, according to a NACK-only transmission configuration. According to aspects of the present disclosure, the available slot may not be an uplink slot, although slots UL #5 and UL #9 are shown. Rather, as described, an available slot may be a flexible slot or a bidirectional slot including both downlink and uplink.

FIG. 4B is a timing diagram 470 illustrating HARQ-ACK codebook retransmission control based on a timer, in accordance with aspects of the present disclosure. This example illustrates transmission of the second PUCCH 344 (e.g., PUCCH #2) of the HARQ-ACK codebook 460 according to the NACK-only transmission configuration of FIG. 4A. Once the second PUCCH 344 (e.g., PUCCH #2) is transmitted, an ACK/NACK retransmission timer is started at time 472 and stopped at time 474. In this example, the ACK/NACK retransmission timer is stopped upon reception of a dynamic grant for SPS PDSCH retransmission 480 for at least one of the negatively acknowledged HARQ-ACK processes (e.g., the NACK in the second bit 464 for the second SPS data 324).

FIG. 4C is a timing diagram 490 illustrating HARQ-ACK codebook retransmission control based on a timer, in accordance with aspects of the present disclosure. Once the second PUCCH 344 (e.g., PUCCH #2) is transmitted, the ACK/NACK retransmission timer is started at time 472 and expires at an expiration time 476. In contrast to the example of FIG. 4B, the ACK/NACK retransmission timer expires because the dynamic grant for SPS PDSCH retransmission 480 is not received. In this configuration, the UE retransmits the HARQ-ACK codebook 460 in a retransmission PUCCH 346 (e.g., ACK/NACK retransmission or a new PUCCH) once the timer expires after the expiration time 474. In this example, autonomous retransmission of the HARQ-ACK codebook 460 is triggered by expiration of the ACK/NACK retransmission timer at the expiration time 476. This autonomous retransmission may be controlled by defining a location of and a number of PUCCH transmission occasions (e.g., at least one additional PUCCH transmission occasion), as shown in FIGS. 5A and 5B.

Figure 5A:
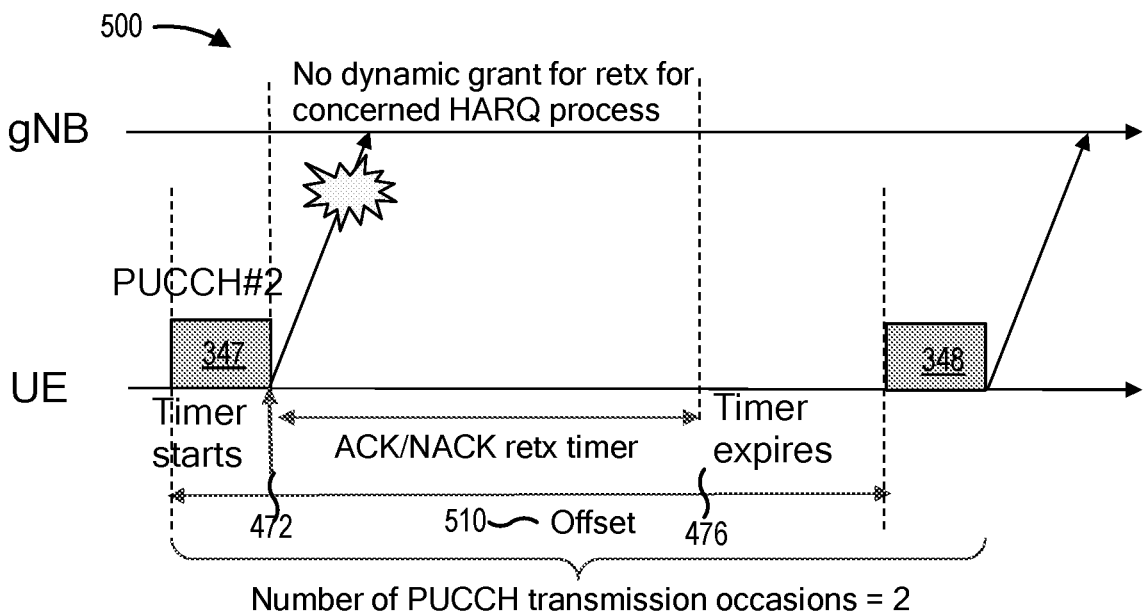
FIGS. 5A and 5B are diagrams illustrating variations of a hybrid automatic repeat request (HARD)-acknowledgment (ACK) codebook retransmission based on the timer of FIG. 4C, in accordance with aspects of the present disclosure.
Figure 5B:
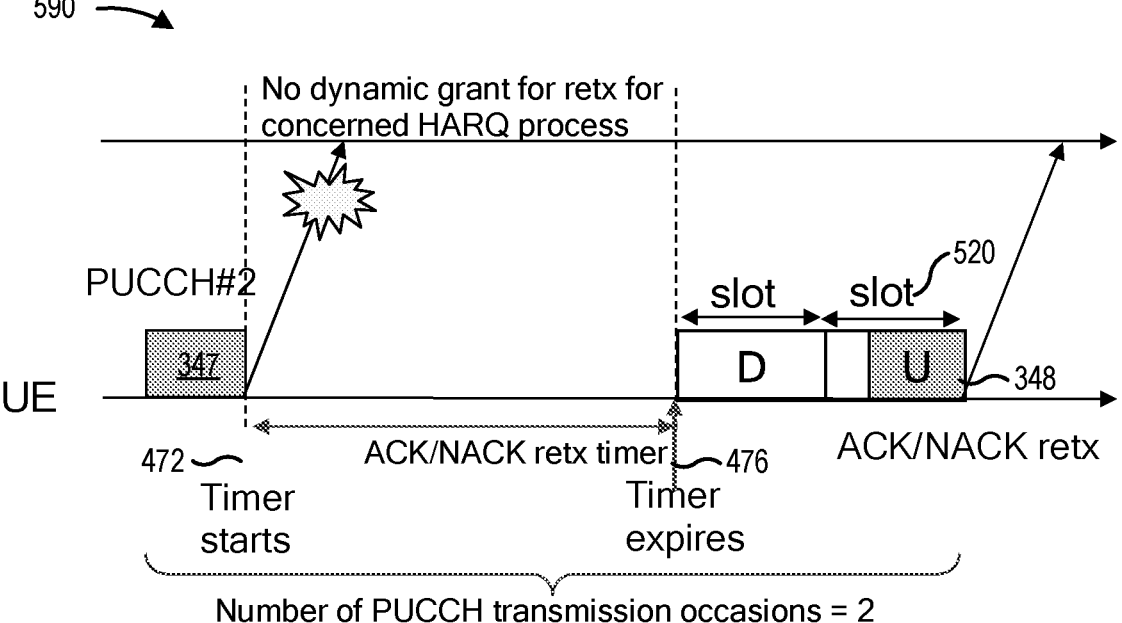

FIGS. 5A and 5B are timing diagrams illustrating variations of the autonomous HARQ-ACK codebook retransmission of FIG. 4C by defining transmission occasions, in accordance with aspects of the present disclosure. FIG. 5A shows a timing diagram 500 of a UE with a configured number of PUCCH transmission occasions (e.g., two) and a configured offset 510 between two adjacent PUCCH transmission occasions (e.g., a configured amount of occasions or a configured amount of retransmissions). In this configuration, the PUCCH transmission occasions may be determined in two ways. A first PUCCH transmission occasion 347 (e.g., the second PUCCH 344 of FIGS. 4B and 4C) may be indicated by physical downlink shared channel (PDSCH)-to-HARQ feedback timing in the activation downlink control information (DCI). A second PUCCH transmission occasion 348 (e.g., retransmission PUCCH 346 of FIG. 4C) may be indicated by a configured offset 510 from the first PUCCH transmission occasion 347 (e.g., the transmission of the second PUCCH 344). A second PUCCH transmission would occur, if configured, the offset after the first PUCCH retransmission.

FIG. 5B shows a timing diagram 590 of a UE that is also configured with a limited number of PUCCH transmission occasions. In this example, the first PUCCH transmission occasion 347 (e.g., the transmission of the second PUCCH 344) is also indicated by the PDSCH-to-HARQ feedback timing in the activation DCI; however, the second PUCCH transmission occasion 348 is at a different transmission occasion, that is, in a first available slot 520 after the timer expires at the expiration time 476. In this example, the retransmission PUCCH 346 of the HARQ-ACK codebook 460 occurs at in the first available slot after the expiration time 476. If an additional retransmission is to occur, it will occur in the first available slot after a next retransmission timer expires. The next retransmission timer begins when the first retransmission occurs.

FIGS. 6A and 6B are block diagrams 600 and 650, respectively, illustrating variations for handling a collision between a HARQ-ACK codebook retransmission and a PUCCH ACK/NACK for a new transmission, in accordance with aspects of the present disclosure. Aspects of the present disclosure address issues involved when the PUCCH for an ACK/NACK retransmission (e.g., the retransmission PUCCH 346) collides with a PUCCH for ACK/NACK of a new transmission 610. As shown in FIG. 6A, the PUCCH for the ACK/NACK retransmission (e.g., the retransmission PUCCH 346) may be prioritized over the PUCCH for the ACK/NACK of the new transmission 610, in one aspect of the present disclosure.

As shown in FIG. 6B, the PUCCH for ACK/NACK retransmission (e.g., the retransmission PUCCH 346) may be multiplexed with the PUCCH for new ACK/NACK bits of the new transmission 610, in another aspect of the present disclosure. In one configuration, the HARQ-ACK bits (e.g., 462, 464) for the ACK/NACK retransmission (e.g., the retransmission PUCCH 346) may be appended to the HARQ-ACK bits for an ACK/NACK new transmission. Alternatively, the HARQ-ACK bits for the ACK/NACK new transmission may be appended to the HARQ-ACK bits for the ACK/NACK retransmission (e.g., the retransmission PUCCH 346) to form a combined PUCCH ACK/NACK for transmission 660.

FIG. 7A is a diagram 700 illustrating a negative acknowledgment (NACK)-only transmission for semi-persistent scheduled (SPS) physical downlink shared channels (PDSCHs) without an associated physical downlink control channel (PDCCH), in accordance with a further aspect of the present disclosure. This example is similar to the example shown in FIG. 4A and, therefore, includes similar reference numbers, so their description is generally omitted.

In this example, the UE is also configured according to three SPS configurations, corresponding to the first PDSCH 310, the second PDSCH 320, and the third PDSCH 330. The combined PDSCH 340 is shown including data slots corresponding to downlink data from the first PDSCH 310, the second PDSCH 320, and the third PDSCH 330. The UE generates the HARQ-ACK codebook 450 for SPS PDSCH data received on the first PDSCH 310, the second PDSCH 320, and the third PDSCH 330.

According to this aspect of the present disclosure, the HARQ-ACK codebook 450 includes an ACK in the first bit 452, the second bit 454, and the third bit 456. Because of the ACK in each bit, the first PUCCH 342 (e.g., PUCCH #1) transmission of the HARQ-ACK codebook 450 is cancelled from the UL #5 slot. Following cancellation of the HARQ-ACK codebook 450 during the UL #5 slot, the HARQ-ACK codebook 460 includes an ACK in the first bit 462 for the first SPS data 314, and a NACK in the second bit 464 for the second SPS data 324. Because of the NACK in the second bit 464, transmission of the second PUCCH 344 (e.g., PUCCH #2) of the HARQ-ACK codebook 460 is performed in the UL #9 slot according to a NACK-only transmission configuration for the second SPS data 324 (e.g., HARQ process ID=5). According to aspects of the present disclosure, the available slot may not be an uplink slot, although slots UL #5 and UL #9 are shown.

FIG. 7B is a timing diagram 770 illustrating HARQ-ACK codebook retransmission control based on a gap between repetitions, in accordance with aspects of the present disclosure. This example illustrates transmission of the second PUCCH 344 (e.g., PUCCH #2) of the HARQ-ACK codebook 460 according to the NACK-only transmission configuration of FIG. 7A. In this example, the UE can be configured with a number of PUCCH repetitions (e.g., two) and a gap 772 between two PUCCH repetitions (e.g., the second PUCCH 344 transmission and the retransmission PUCCH 346). In this configuration, the UE repeats the retransmission PUCCH 346 over a number of PUCCH repetitions with the gap 772 between the retransmission PUCCH 346. In this example, a dynamic grant for an SPS PDSCH retransmission 780 is received for the NACK in the second bit 464 corresponding to the second SPS data 324). The UE terminates the retransmission PUCCH 346 in response to the dynamic grant for the SPS PDSCH retransmission 780. In one configuration, the gap 772 is a multiple of slots or a multiple of symbols configured by a radio resource control (RRC).

FIG. 7C is a timing diagram 790 illustrating HARQ-ACK codebook retransmission control based on a gap between repetitions, in accordance with aspects of the present disclosure. Once the second PUCCH 344 is transmitted, the retransmission PUCCH 346 is transmitted after the gap 772 because the dynamic grant for SPS PDSCH retransmission 780 is not received. In this configuration, the UE retransmits the HARQ-ACK codebook 460 in a retransmission PUCCH 346 (e.g., ACK/NACK retransmission) following the gap 772. In this example, retransmission of the HARQ-ACK codebook 460 is limited to a predetermined number of PUCCH repetitions (e.g., two).

Figures 8A, 8B, 8C:
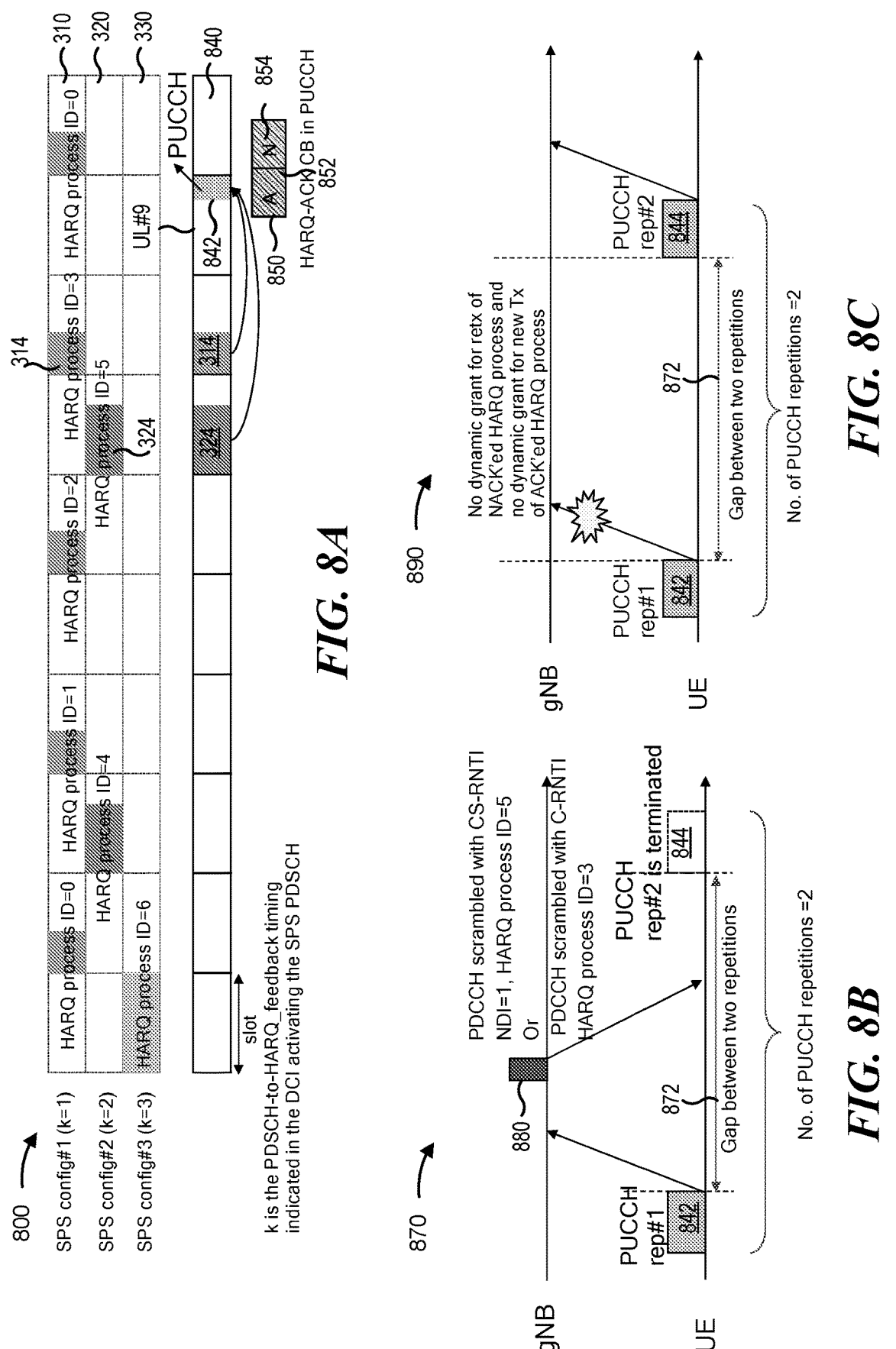
FIGS. 8A-8C are diagrams illustrating an acknowledgment/negative acknowledgment (ACK/NACK) transmission for semi-persistent scheduled (SPS) physical downlink shared channels (PDSCHs) without an associated physical downlink control channel (PDCCH), in accordance with another aspect of the present disclosure.

FIG. 8A is a diagram 800 illustrating an acknowledgment/ negative acknowledgment (ACK/NACK) transmission for semi-persistent scheduled (SPS) physical downlink shared channels (PDSCHs) without an associated physical downlink control channel (PDCCH), in accordance with a further aspect of the present disclosure. This example includes elements similar to the elements in the example shown in FIG. 7A and, therefore, includes similar reference numbers, so their description is generally omitted.

In this example, the UE is also configured according to three SPS configurations, corresponding to the first PDSCH 310, the second PDSCH 320, and the third PDSCH 330. A combined PDSCH 840 is shown including data slots corresponding to downlink data from the first PDSCH 310, the second PDSCH 320, and the third PDSCH 330. The UE generates a HARQ-ACK codebook 850, includes an ACK in a first bit 852 for the first SPS data 314, and a NACK in a second bit 854 for the second SPS data 324. Transmission of a PUCCH 842 (e.g., PUCCH rep #1) of the HARQ-ACK codebook 850 is performed in the UL #9 slot according to this ACK/NACK transmission configuration for the second SPS data 324 (e.g., HARQ process ID=5).

FIG. 8B is a timing diagram 870 illustrating HARQ-ACK codebook retransmission control based on a gap between repetitions, in accordance with aspects of the present disclosure. This example illustrates transmission of the PUCCH 842 (e.g., PUCCH rep #1) of the HARQ-ACK codebook 850 according to the ACK/NACK transmission configuration of FIG. 8A. In this example, the UE can be configured with a number of PUCCH repetitions (e.g., two) and a gap 872 between two PUCCH repetitions (e.g., the PUCCH 842 and a retransmission PUCCH 844). In this configuration the UE repeats the retransmission PUCCH 844 (e.g., PUCCH rep #2) over a number of PUCCH repetitions with the gap 872 between the PUCCH 842 (e.g., PUCCH rep #1) and the retransmission PUCCH 844 (e.g., PUCCH rep #2). In this example, a dynamic grant for SPS PDSCH retransmission 880 is received for the NACK in the second bit 854 corresponding to the second SPS data 324). The UE terminates the retransmission PUCCH 36 in response to the dynamic grant for SPS PDSCH retransmission 880. In this example, the UE also terminates the retransmission in response to receiving any dynamic grant for an SPS PDSCH new transmission for an acknowledged HARQ process. In this example, the PUCCH 842 is acknowledged and thus the dynamic grant can be for that HARQ process.

FIG. 8C is a timing diagram 890 illustrating HARQ-ACK codebook retransmission control based on a gap between repetitions, in accordance with aspects of the present disclosure. Once the PUCCH 842 (e.g., PUCCH rep #1) is transmitted, the the retransmission PUCCH 844 (e.g., PUCCH rep #2) is transmitted after the gap 872 because the dynamic grant for SPS PDSCH retransmission or new transmission 880 is not received. In this configuration, the UE retransmits the HARQ-ACK codebook 850 in the retransmission PUCCH 844 (e.g., PUCCH rep #2) following the gap 872. In this example, retransmission of the HARQ-ACK codebook 850 is also limited to a predetermined number of PUCCH repetitions (e.g., two).

In this aspect of the present disclosure, the UE is configured with a number of PUCCH repetitions and a gap between two PUCCH repetitions. Accordingly, the UE repeats the PUCCH over a number of PUCCH repetitions with a gap between them if the UE neither receives any dynamic grant for SPS PDSCH retransmission for the negatively acknowledged HARQ processes nor receives any dynamic grant for SPS PDSCH new transmission for the acknowledged HARQ processes, as shown in FIG. 8C. Otherwise, if the UE receives a dynamic grant for SPS PDSCH retransmission for at least one negatively acknowledged HARQ process or receives a dynamic grant for an SPS PDSCH new transmission (e.g., 880) for at least one of acknowledged HARQ process during the gap between two PUCCH repetitions, the UE terminates the remaining PUCCH repetitions, as shown in FIG. 8B.

Further aspects of the disclosure discuss how to determine the physical uplink control channel (PUCCH) transmission power, frequency hopping, and uplink (UL) transmit (Tx) beams (e.g., spatialrelationinfo) for different PUCCH transmission occasions or different PUCCH repetitions to increase PUCCH reliability. The terms "PUCCH transmission occasion" and "PUCCH repetition(s)" may be used interchangeably. In this aspect, the PUCCH transmission occasion indicated to the UE for the first PUCCH transmission (or previous PUCCH transmission) is "0" and each subsequent PUCCH transmission occasion, until the UE transmits the PUCCH in a number of PUCCH transmission occasions, is counted regardless of whether the UE transmits the PUCCH.

Figure 9:
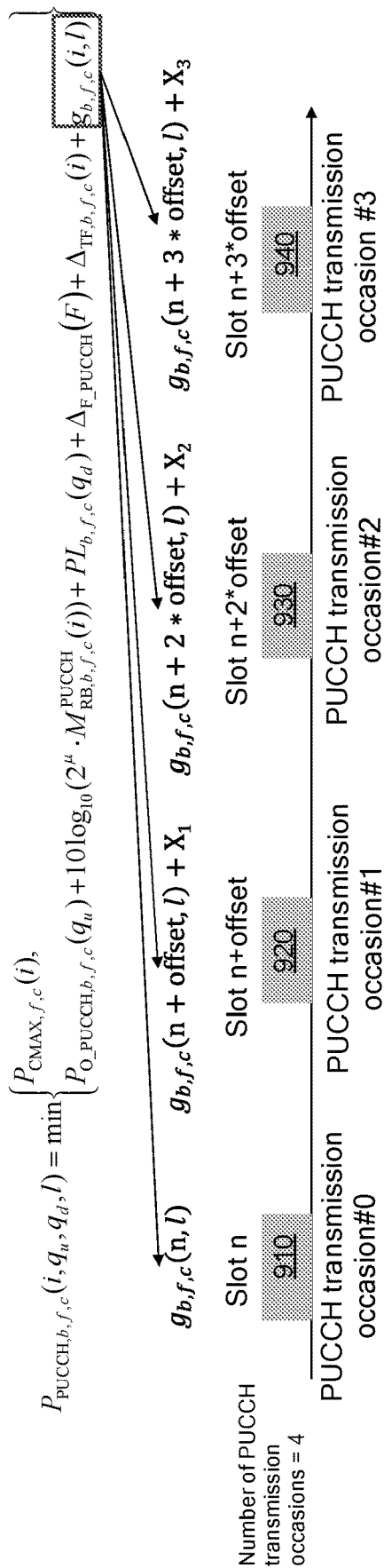
FIG. 9 is a diagram illustrating power ramping of codebook retransmissions, in accordance with aspects of the present disclosure.

FIG. 9 is a diagram 900, illustrating power ramping of retransmissions, in accordance with aspects of the present disclosure. In this aspect of the present disclosure, a power boost for PUCCH transmission in multiple PUCCH transmission occasions (e.g., 910, 920, 930, and 940) is disclosed. The UE can be configured whether or not to perform power boosting for PUCCH transmissions in multiple PUCCH transmission occasions. If the UE is configured to perform power boosting for multiple PUCCH transmission occasions (e.g., 910, 920, 930, and 940), the UE transmits the PUCCH in the PUCCH transmission occasion m with an additional power increase by $X_m$ dB, where $X_m=0$ for m=0. When m≠0, in one aspect, the value of $X_m$ is specified in the 5G NR standard. In an alternate aspect, a set of values for $X_m$ is configured by radio resource control (RRC) signaling, and the UE autonomously selects one of the values. For example, a transmission occasion 920 during a second time is boosted by a predetermined amount (e.g., $X_1$). Similarly, a transmission occasion 930 is boosted by a predetermined amount (e.g., $X_2$), and a transmission occasion 940 is boosted by a predetermined amount (e.g., $X_3$)

Figures 10A, 10B:
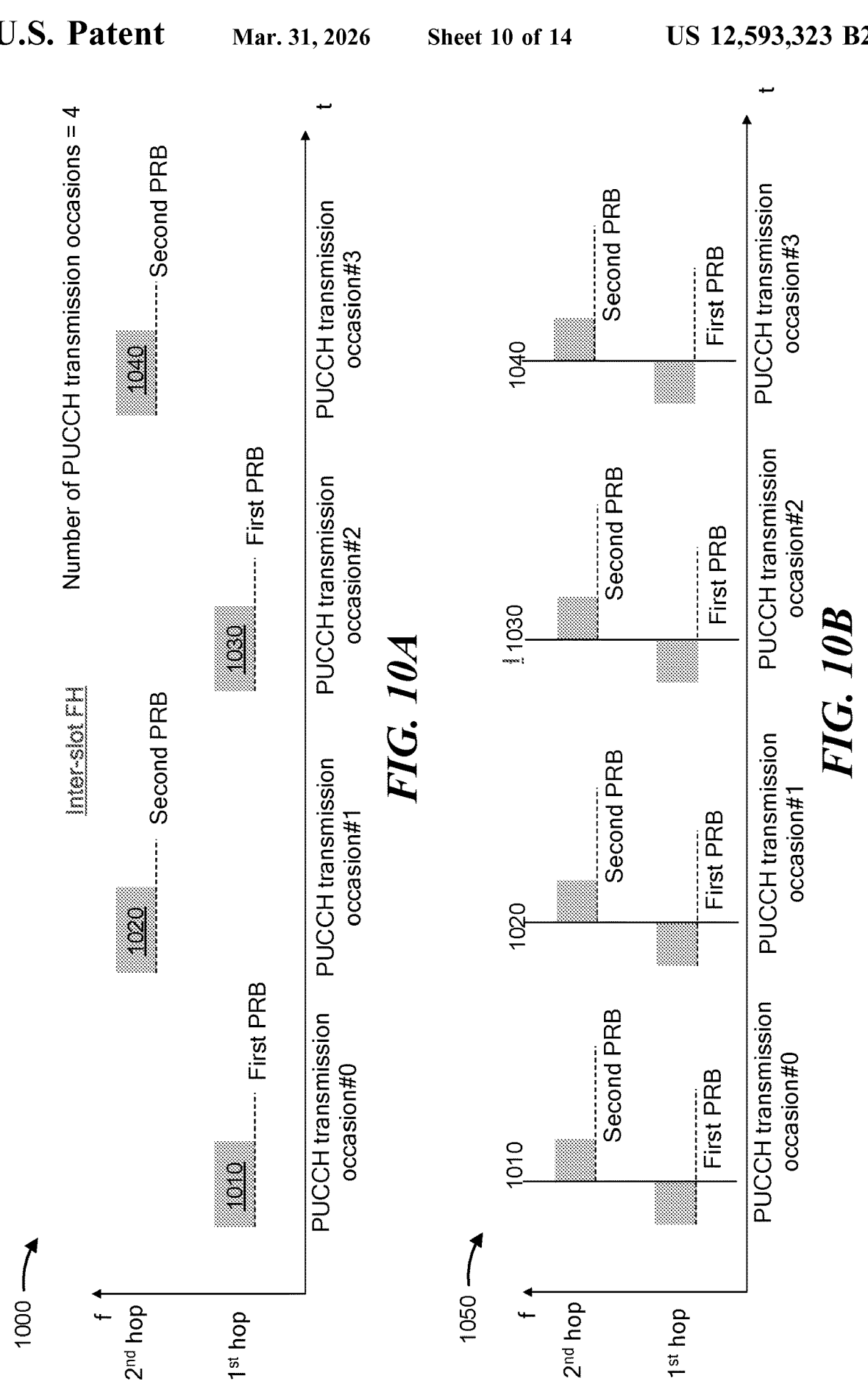
FIGS. 10A and 10B are diagrams illustrating frequency hopping of retransmissions, in accordance with aspects of the present disclosure.

FIGS. 10A and 10B are diagrams illustrating frequency hopping of retransmissions, in accordance with aspects of the present disclosure. In this aspect of the present disclosure, frequency hopping for physical uplink control channel (PUCCH) transmission in multiple PUCCH transmission occasions achieves frequency diversity. As shown in the diagram 1000 of FIG. 10A, the UE can be configured to perform frequency hopping for PUCCH transmissions in multiple PUCCH transmission occasions (e.g., 1010, 1020, 1030, and 1040). According to an inter-slot frequency hopping (e.g., Inter-slot FH) configuration, the UE transmits the PUCCH starting from a first physical resource block (PRB) provided by radio resource control (RRC) signaling, in PUCCH transmission occasions with even numbers (e.g., 1010 and 1030) and starting from the second PRB, provided by RRC signaling, in PUCCH transmission occasions with odd numbers (e.g., 1020 and 1040).

FIG. 10B is a diagram 1050 illustrating frequency hopping within a transmission occasion, in which the UE is configured to perform frequency hopping for a PUCCH transmission within a PUCCH transmission occasion. In this example, the UE is not configured to perform frequency hopping for PUCCH transmissions across different PUCCH transmission occasions. Rather, the UE is configured to perform frequency hopping for PUCCH transmissions within a PUCCH transmission occasion (e.g., 1010, 1020, 1030, and 1040). In this configuration, the frequency hopping pattern between the first PRB and the second PRB is the same within each PUCCH transmission occasion (e.g., 1010,

1020, 1030, and 1040). A number of symbols for the first hop and the second hop follows current 3GPP specifications.

Figure 11:
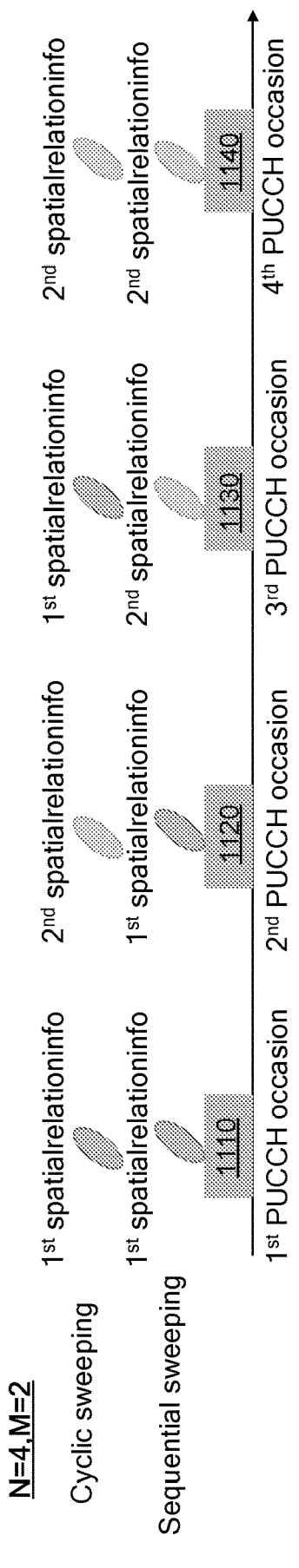
FIG. 11 is a diagram, illustrating beam sweeping of retransmissions, in accordance with aspects of the present disclosure.

FIG. 11 is a diagram 1100, illustrating beam sweeping of retransmissions, in accordance with aspects of the present disclosure. In this aspect of the present disclosure, beam sweeping is performed for PUCCH transmissions in multiple PUCCH transmission occasions (e.g., 1110, 1120, 1130, and 1140). In this aspect of the disclosure, transmit (Tx) beam sweeping for physical uplink control channel (PUCCH) transmissions in multiple PUCCH transmission occasions (e.g., 1110, 1120, 1130, and 1140) is disclosed. The UE can be configured with RRC signaling or activated with a MAC-CE (media access control-control element) with multiple PUCCH spatial relationships (e.g., spatialrelationinfos) (e.g., M) for a PUCCH resource with multiple PUCCH transmission occasions (e.g., 1110, 1120, 1130, and 1140). One option is cyclic beam sweeping, where the UE transmits PUCCH in the n-th PUCCH transmission occasion using m-th spatialrelationinfo, where m=mod(n−1,M)+1, n=1 . . . , N, and N is the number of PUCCH transmission occasions. That is, a different beam is used for different PUCCH transmission occasions.

Another option is sequential beam sweeping, where the UE transmits PUCCH in the first N/M (or ceil(N/M) or floor(N/M)) PUCCH transmission occasions using the first PUCCH spationrelationinfo, transmit PUCCH in the second N/M (or ceil(N/M) or floor(N/M)) PUCCH transmission occasions using the second PUCCH spationrelationinfo, and the like. The decision to use either cyclic beam sweeping or sequential beam sweeping can be predefined or configured by radio resource control (RRC) signaling. This process includes transmitting the HARQ codebook at least one additional time in at least one additional PUCCH transmission occasion in accordance with cyclic beam sweeping.

A method for fifth generation (5G) new radio (NR) hybrid automatic repeat request (HARQ)-acknowledgment (ACK) enhancement for SPS physical downlink shared channel (PDSCH) is shown in FIG. 12, according to aspects of the present disclosure. A method for fifth generation (5G) new radio (NR) hybrid automatic repeat request (HARQ)-acknowledgment (ACK) enhancement for SPS physical downlink shared channel (PDSCH) is shown in FIG. 13, according to another aspect of the present disclosure. A method for fifth generation (5G) new radio (NR) hybrid automatic repeat request (HARQ)-acknowledgment (ACK) enhancement for SPS physical downlink shared channel (PDSCH) is shown in FIG. 14, according to another aspect of the present disclosure. As indicated above, FIGS. 3-11 are provided as examples. Other examples may differ from what is described with respect to FIGS. 3-11.

FIG. 12 is a diagram illustrating an example process 1200 performed, for example, by a UE, in accordance with various aspects of the present disclosure. The example process 1200 is an example of a 5G new radio (NR) hybrid automatic repeat request (HARQ)-acknowledgment (ACK) enhancement for SPS physical downlink shared channel (PDSCH).

As shown in FIG. 12, in some aspects, the process 1200 includes receiving downlink semi-persistent scheduling (SPS) configurations (block 1202). For example, the UE (e.g., using the antenna 252, the DEMOD/MOD 254, the receive processor 268, the controller/processor 280, and/or the memory 282) can receive downlink semi-persistent scheduling (SPS) configurations. In some aspects, the process 1200 also includes receiving a physical downlink shared channel (PDSCH) transmission for each of the SPS configurations. Each PDSCH transmission has no associated physical downlink control channel (PDCCH) (block 1204). For example, the UE (e.g., using the antenna 252, the DEMOD/MOD 254, the receive processor 268, the controller/processor 280, and/or the memory 282) can receive the PDSCH transmission for each of the SPS configurations.

In some aspects, the process 1200 further includes determining whether successful decoding of each of the PDSCH transmissions occurred (block 1206). For example, the UE (e.g., using the DEMOD/MOD 254, the receive processor 268, the controller/processor 280, and/or the memory 282) can determine successful decoding of each of the PDSCH transmission. In some aspects, the process 1200 further includes generating a hybrid automatic repeat request (HARQ) codebook for the PDSCH transmissions based on the determining (block 1208). For example, the UE (e.g., using the receive processor 268, the controller/processor 280, and/or the memory 282) can generated the HARQ codebook. In some aspects, the process 1200 also includes transmitting the HARQ codebook in a physical uplink control channel (PUCCH) only when at least one ACK is present in the HARQ codebook (block 1210). For example, the UE (e.g., using the antenna 252, the DEMOD/MOD 254, the TX MIMO processor 266, the transmit processor 264, the controller/processor 280, and/or the memory 282) can transmit the HARQ codebook.

FIG. 13 is a diagram illustrating an example process 1300 performed, for example, by a UE, in accordance with various aspects of the present disclosure. The example process 1300 is an example of a 5G new radio (NR) hybrid automatic repeat request (HARQ)-acknowledgment (ACK) enhancement for SPS physical downlink shared channel (PDSCH).

As shown in FIG. 13, in some aspects, the process 1300 includes receiving downlink semi-persistent scheduling (SPS) configurations (block 1302). For example, the UE (e.g., using the antenna 252, the DEMOD/MOD 254, the receive processor 268, the controller/processor 280, and/or the memory 282) can receive the downlink SPS configurations. In some aspects, the process 1300 also includes receiving a physical downlink shared channel (PDSCH) transmission for each of the SPS configurations. Each PDSCH transmission has no associated physical downlink control channel (PDCCH) (block 1304). For example, the UE (e.g., using the antenna 252, the DEMOD/MOD 254, the receive processor 268, the controller/processor 280, and/or the memory 282) can receive the PDSCH transmission for each of the SPS configurations.

In some aspects, the process 1300 further includes determining whether successful decoding of each of the PDSCH transmissions occurred (block 1306). For example, the UE (e.g., using the DEMOD/MOD 254, the receive processor 268, the controller/processor 280, and/or the memory 282) can determine successful decoding of each of the PDSCH transmission. In some aspects, the process 1300 further includes generating a hybrid automatic repeat request (HARQ) codebook for the PDSCH transmissions based on the determining (block 1308). For example, the UE (e.g., using the receive processor 268, the controller/processor 280, and/or the memory 282) can generated the HARQ codebook. In some aspects, the process 1300 also includes transmitting the HARQ codebook in a physical uplink control channel (PUCCH) only when at least one NACK is present in the HARQ codebook (block 1310). For example, the UE (e.g., using the antenna 252, the DEMOD/MOD 254, the TX MIMO processor 266, the transmit processor 264, the controller/processor 280, and/or the memory 282) can transmit the HARQ codebook.

FIG. 14 is a diagram illustrating an example process 1400 performed, for example, by a UE, in accordance with various aspects of the present disclosure. The example process 1400 is an example of a 5G new radio (NR) hybrid automatic repeat request (HARQ)-acknowledgment (ACK) enhancement for SPS physical downlink shared channel (PDSCH).

As shown in FIG. 14, in some aspects, the process 1400 includes receiving downlink semi-persistent scheduling (SPS) configurations (block 1402). For example, the UE (e.g., using the antenna 252, the DEMOD/MOD 254, the receive processor 268, the controller/processor 280, and/or the memory 282) can receive the downlink SPS configurations. In some aspects, the process 1400 also includes receiving a physical downlink shared channel (PDSCH) transmission for each of the SPS configurations. Each PDSCH transmission has no associated physical downlink control channel (PDCCH) (block 1404). For example, the UE (e.g., using the antenna 252, the DEMOD/MOD 254, the receive processor 268, the controller/processor 280, and/or the memory 282) can receive the PDSCH transmission for each of the SPS configurations.

In some aspects, the process 1400 further includes determining whether successful decoding of each of the PDSCH transmissions occurred (block 1406). For example, the UE (e.g., using the DEMOD/MOD 254, the receive processor 268, the controller/processor 280, and/or the memory 282) can determine successful decoding of each of the PDSCH transmission. In some aspects, the process 1400 further includes generating a hybrid automatic repeat request (HARQ) codebook for the PDSCH transmissions based on the determining (block 1408). For example, the UE (e.g., using the receive processor 268, the controller/processor 280, and/or the memory 282) can generated the HARQ codebook. In some aspects, the process 1300 also includes transmitting the HARQ codebook in a physical uplink control channel (PUCCH) (block 1410). For example, the UE (e.g., using the antenna 252, the DEMOD/MOD 254, the TX MIMO processor 266, the transmit processor 264, the controller/processor 280, and/or the memory 282) can transmit the HARQ codebook.

In some aspects, the process 1300 also includes repeating transmitting of the HARQ codebook a configured amount of times, with a gap configured between PUCCH repetitions (block 1412). For example, the UE (e.g., using the antenna 252, the DEMOD/MOD 254, the TX MIMO processor 266, the transmit processor 264, the controller/processor 280, and/or the memory 282) can repeat transmitting of the HARQ codebook. In some aspects, the process 1300 also includes stopping repeating in response to receiving a dynamic grant for SPS PDSCH retransmission for at least one negatively acknowledged HARQ process or receiving a dynamic grant for an SPS PDSCH new transmission for at least one acknowledged HARQ process. (block 1414). For example, the UE (e.g., using the antenna 252, the DEMOD/MOD 254, the TX MIMO processor 266, the transmit processor 264, the receive processor 268, the controller/processor 280, and/or the memory 282) can stop repeating transmitting of the HARQ codebook.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication, by a user equipment (UE), comprising:
    receiving a plurality of downlink semi-persistent scheduling (SPS) configurations;
    receiving a physical downlink shared channel (PDSCH) transmission for each of the plurality of SPS configurations, each PDSCH transmission having no associated physical downlink control channel (PDCCH);
    determining whether successful decoding of each of the PDSCH transmissions occurred;
    generating a hybrid automatic repeat request (HARQ) codebook for the PDSCH transmissions based on the determining; and
    transmitting the HARQ codebook in a physical uplink control channel (PUCCH), wherein transmitting the HARQ codebook in the PUCCH comprises transmitting only when at least one acknowledgment (ACK) is present in the HARQ codebook or only when at least one negative acknowledgment (NACK) is present in the HARQ codebook, wherein transmitting the HARQ codebook in the PUCCH comprises:
    starting an ACK/NACK retransmission timer in response to transmitting the HARQ codebook in the PUCCH;
    stopping the retransmission timer in response to receiving a dynamic grant for SPS PDSCH retransmission for at least one negatively acknowledged HARQ process; and
    retransmitting the HARQ codebook in an additional PUCCH transmission occasion in response to the timer expiring.

2. The method of claim 1, further comprising:
    cancelling the PUCCH when only NACK(s) are present in the codebook; or
    cancelling the PUCCH when only ACK(s) are is present in the codebook.

3. The method of claim 1, further comprising transmitting the PUCCH when a PUCCH resource assigned to carry the HARQ codebook is also assigned to carry other uplink information.

4. The method of claim 1, in which retransmitting occurs during a configured amount of occasions, a configured offset after a previous PUCCH transmission.

5. The method of claim 1, in which retransmitting occurs during a configured amount of occasions after a first available slot subsequent to the timer expiring, and in which the first available slot subsequent to the timer expiring comprises an uplink slot or a downlink slot.

6. The method of claim 1, further comprising retransmitting the HARQ codebook in the additional PUCCH transmission occasion instead of transmitting a new PUCCH for ACK/NACK transmission in the additional PUCCH transmission occasion.

7. The method of claim 1, further comprising:
    retransmitting the HARQ codebook in the additional PUCCH transmission occasion multiplexed with new ACK/NACK bits; and
    appending the new ACK/NACK bits to the HARQ codebook; or
    appending the HARQ codebook to the new ACK/NACK bits.

8. The method of claim 1, in which transmitting the HARQ codebook in the PUCCH only when at least one NACK is present in the HARQ codebook further comprises:
    repeating transmitting of the HARQ codebook a configured amount of times in response to the timer expiring, with a gap configured between PUCCH repetitions; and
    stopping repeating in response to receiving a dynamic grant for SPS PDSCH retransmission for at least one negatively acknowledged HARQ process.

9. The method of claim 1, in which transmitting the HARQ codebook in the PUCCH only when at least one NACK is present in the HARQ codebook further comprises transmitting the HARQ codebook a second time in an additional PUCCH occasion with a power boost.

10. The method of claim 9, further comprising:
    selecting an amount of the power boost based on a set of values signaled to the UE; or
    selecting the amount of the power boost based on a predetermined value.

11. The method of claim 1, in which transmitting the HARQ codebook in the PUCCH only when at least one NACK is present in the HARQ codebook further comprises:

transmitting the HARQ codebook a second time in an additional PUCCH occasion at a second physical resource block (PRB), and in which the second PRB occurs in a different transmission occasion than when transmitting the HARQ codebook in the PUCCH, or in which the second PRB occurs in a same transmission occasion as when transmitting the HARQ codebook in the PUCCH.

12. The method of claim 1, in which transmitting the HARQ codebook in the PUCCH only when at least one NACK is present in the HARQ codebook further comprises:

transmitting the HARQ codebook at least one additional time in at least one additional PUCCH transmission occasion in accordance with cyclic beam sweeping; or transmitting the HARQ codebook at least one additional time in at least one additional PUCCH transmission occasion in accordance with sequential beam sweeping.

13. A user equipment (UE), comprising:

a processor;

a memory coupled with the processor; and instructions stored in the memory and operable, when executed by the processor, to cause the UE:

to receive a plurality of downlink semi-persistent scheduling (SPS) configurations;

to receive a physical downlink shared channel (PDSCH) transmission for each of the plurality of SPS configurations, each PDSCH transmission having no associated physical downlink control channel (PDCCH);

to determine whether successful decoding of each of the PDSCH transmissions occurred;

to generate a hybrid automatic repeat request (HARQ) codebook for the PDSCH transmissions based on the determining;

to transmit the HARQ codebook in a physical uplink control channel (PUCCH) only when at least one acknowledgment (ACK) is present in the HARQ codebook; or to transmit the HARQ codebook in a physical uplink control channel (PUCCH) only when at least one negative acknowledgment (NACK) is present in the HARQ codebook, wherein the instructions to transmit the HARQ codebook in a physical uplink control channel (PUCCH) only when at least one NACK is present in the HARQ codebook further cause the UE:

to start an ACK/NACK retransmission timer in response to transmitting the HARQ codebook in the PUCCH;

to stop the retransmission timer in response to receiving a dynamic grant for SPS PDSCH retransmission for at least one negatively acknowledged HARQ process; and to retransmit the HARQ codebook in an additional PUCCH transmission occasion in response to the timer expiring.

14. The UE of claim 13, in which the instructions further cause the UE:

to cancel the PUCCH when only ACK(s) are present in the codebook; or to cancel the PUCCH when only NACK(s) are is present in the codebook.

15. The UE of claim 13, in which the instructions further cause the UE to transmit the PUCCH when a PUCCH resource assigned to carry the HARQ codebook is also assigned to carry other uplink information.

16. The UE of claim 13, in which the instruction to retransmit occurs during a configured amount of occasions, a configured offset after a previous PUCCH transmission.

17. The UE of claim 13, in which the instruction to retransmit occurs during a configured amount of occasions after a first available slot subsequent to the timer expiring, and in which the first available slot subsequent to the timer expiring comprises an uplink slot or a downlink slot.

18. A user equipment (UE), comprising:

a processor;

a memory coupled with the processor; and instructions stored in the memory and operable, when executed by the processor, to cause the UE:

to receive a plurality of downlink semi-persistent scheduling (SPS) configurations;

to receive a physical downlink shared channel (PDSCH) transmission for each of the plurality of SPS configurations, each PDSCH transmission having no associated physical downlink control channel (PDCCH);

to determine whether successful decoding of each of the PDSCH transmissions occurred;

to generate a hybrid automatic repeat request (HARQ) codebook for the PDSCH transmissions based on the determining;

to transmit the HARQ codebook in a physical uplink control channel (PUCCH);

wherein the instructions to transmit the HARQ codebook in the PUCCH further cause the UE:

to start an ACK/NACK retransmission timer in response to transmitting the HARQ codebook in the PUCCH;

to stop the retransmission timer in response to receiving a dynamic grant for SPS PDSCH retransmission for at least one negatively acknowledged HARQ process; and to retransmit the HARQ codebook in an additional PUCCH transmission occasion in response to the timer expiring.

\* \* \* \* \*